United States Patent
Li

(10) Patent No.: US 8,775,281 B2
(45) Date of Patent: Jul. 8, 2014

(54) COLOR DETECTION FOR TIERED BILLING IN COPY AND PRINT JOBS

(75) Inventor: Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 260 days.

(21) Appl. No.: 12/962,298

(22) Filed: Dec. 7, 2010

(65) Prior Publication Data

US 2012/0143736 A1 Jun. 7, 2012

(51) Int. Cl.
 G07F 19/00 (2006.01)
 H04M 15/00 (2006.01)

(52) U.S. Cl.
 USPC ............. 705/34; 705/29; 705/30; 705/32; 705/40; 705/26.44

(58) Field of Classification Search
 None
 See application file for complete search history.

(56) References Cited

U.S. PATENT DOCUMENTS

| | | | |
|---|---|---|---|
| 4,065,031 A | 12/1977 | Wiggins et al. | |
| 5,204,699 A | 4/1993 | Birnbaum et al. | |
| 5,867,198 A | 2/1999 | Gwaltney et al. | |
| 6,249,592 B1 * | 6/2001 | Fan et al. | 382/112 |
| 6,529,291 B1 * | 3/2003 | Schweid et al. | 358/1.9 |
| 6,844,937 B2 | 1/2005 | Dempsey et al. | |
| 6,934,412 B2 * | 8/2005 | Bares | 382/165 |
| 6,972,857 B2 | 12/2005 | Mantell et al. | |
| 7,116,443 B2 * | 10/2006 | Handley et al. | 358/1.9 |
| 2002/0075491 A1 * | 6/2002 | Bares | 358/1.9 |
| 2003/0206307 A1 * | 11/2003 | Handley et al. | 358/1.9 |
| 2004/0213593 A1 * | 10/2004 | Brewington et al. | 399/27 |
| 2005/0206982 A1 | 9/2005 | Hattori | |
| 2005/0226503 A1 | 10/2005 | Bailey et al. | |
| 2006/0101523 A1 | 5/2006 | Talbert | |
| 2006/0222382 A1 * | 10/2006 | Gady et al. | 399/27 |
| 2009/0099980 A1 | 4/2009 | Ni et al. | |
| 2009/0195799 A1 * | 8/2009 | Malik et al. | 358/1.9 |
| 2009/0195800 A1 * | 8/2009 | Malik et al. | 358/1.9 |
| 2009/0195801 A1 * | 8/2009 | Malik et al. | 358/1.9 |
| 2009/0226082 A1 | 9/2009 | Li | |
| 2010/0005038 A1 | 1/2010 | Nagarajan et al. | |
| 2010/0088201 A1 | 4/2010 | Nagarajan et al. | |
| 2010/0100505 A1 | 4/2010 | Campbell et al. | |
| 2010/0280929 A1 | 11/2010 | Coffey et al. | |

OTHER PUBLICATIONS

Ashlee Vance, New Inks Cut Costs of Office Color Printing, www.newyorktimes.com, May 6, 2009.

Xerox Corporation, Xerox ColorQube 9200 series Three Tiered Billing.

Rafael Diaz et al., Hybrid Color Plan White Paper Phaser 8860/8860MFP, Xerox Corporation, May 2008.

* cited by examiner

*Primary Examiner* — Fateh Obaid

(74) *Attorney, Agent, or Firm* — Pillsbury Winthrop Shaw Pittman LLP

(57) ABSTRACT

Disclosed herein are a method and an image processing apparatus implementing the method for determining a billing structure for outputting documents. The method determines if pixels of image data of a document in device independent space are neutral (e.g., gray) or non-neutral (e.g., color), and, based on at least the determined neutral pixels in device independent space, determines a billable pixel count of color pixels in the image data. In one example, the determined billable pixel count of color pixels is based on at least both an estimated color count in device independent space and a determined pixel count in device dependent space. In another, pixels are tagged based on the neutral and/or non-neutral determination in device independent space, and, if the tag indicates that a selected pixel is color in device dependent space, the selected pixel is counted for the billable pixel count.

33 Claims, 13 Drawing Sheets

CONTROL OF BINARY PIXEL COUNTERS WITH NEUTRAL PIXEL DETECTION

TAG CONTROLLED PIXEL COUNTING

| COUNTER NAME | FORMAT | COMMENT |
|---|---|---|
| *BINARY1* | U32.0 (ORU29.0) | ANY ONE OR TWO OF C, M AND Y IS ON; K IS OFF |
| *BINARY2* | U32.0 (ORU29.0) | K IS ON; THE REST IS OFF |
| *BINARY3* | U32.0 (ORU29.0) | ALL C, M AND Y ARE ON; K IS OFF |
| *BINARY4* | U32.0 (ORU29.0) | K IS ON BUT K IS NOT THE ONLY THING THAT'S ON |
| *CONTROL* | U8.0 | CONTROLS THE COUNTERS |

TABLE 1 DEFINITIONS OF REGISTERS IN PIXEL COUNTING

FIG. 8

| BIT | DEFINITION |
| --- | --- |
| 0 | SPECIFY WHAT SHOULD NEUTRAL PIXEL TAG OF "00" BE MAPPED TO |
| 1 | SPECIFY WHAT SHOULD NEUTRAL PIXEL TAG OF "01" BE MAPPED TO |
| 2 | SPECIFY WHAT SHOULD NEUTRAL PIXEL TAG OF "10" BE MAPPED TO |
| 3 | SPECIFY WHAT SHOULD NEUTRAL PIXEL TAG OF "11" BE MAPPED TO |
| 4 | MASK BIT CORRESPONDING TO COUNTERBINARY1 |
| 5 | MASK BIT CORRESPONDING TO COUNTERBINARY2 |
| 6 | MASK BIT CORRESPONDING TO COUNTERBINARY3 |
| 7 | MASK BIT CORRESPONDING TO COUNTERBINARY4 |

TABLE 2 DEFINITION OF THE BITS IN COUNTERCONTROL

FIG. 9

COLOR DETECTION FOR TIERED BILLING IN COPY AND PRINT JOBS

BACKGROUND

1. Field

The present disclosure is generally related to choosing a billing structure based on an amount of color in a document, and, in particular, to a system and method for determining a billing structure for outputting documents based on an estimation of color pixels in the document determined through processes utilizing image data when in device independent and device dependent states.

2. Description of Related Art

Image data comprises a number of pixels having a number of components that contribute to defining the image, such as color and intensity. The image data generally includes various color or gray levels, which contribute to the intensity of each pixel in the image. Each pixel of the image is assigned a number representing the amount of light or gray level for that space at that particular spot; i.e., the shade of gray in the pixel. Binary image data has two possible values for each pixel, black (represented by the number "1") or white (represented by the number "0"). Images that have a large range of shades are referred to as grayscale images. For example, grayscale images have an 8-bit value per pixel comprising 256 tones or shades of gray for each pixel in the image (gray level of 0 to 255). Grayscale image data may also be referred to as continuous tone or contone image data. The pixels in a color image may be defined in terms of a color space, typically with three values, such as RGB—R for red, G for green, and B for blue—or four values, such as CMYK—C for cyan, M for magenta, Y for yellow, and K for black.

The pixels may also be defined in terms of device independent space (e.g., when inputting image data, such as standard RGB (sRGB) or CIE L*a*b) or a device dependent space (e.g., when outputting image data, such as RGB or CMYK). When outputting image data to an output device (e.g., copier, printer, or multi-function device (MFD)), a percentage scale may be used to identify how much ink is employed for a print job. Such information may typically be used for billing a customer for print jobs. For example, some methods employ a billing strategy based on an estimated amount of ink or toner consumption; others bill customers based on a print mode selection (e.g., draft, standard, color, enhanced, etc.) of the output device. In dynamic print job environments, because printing documents using black ink or toner is less expensive than using colored ink or toner, billing is often based on the amount of color content contained in the job to be printed. In order to bill customers for color printing, color detection is an important feature required in an image path. Color detection is used to analyze documents for presence of color as well as an amount of color in order to bill customers accordingly. Generally, the higher the presence and amount of color in a document, the higher the cost.

Some systems include counting the number of pixels in the image data of the document to be printed. For example, a number of binary pixels associated with the CMYK color planes may be counted to determine a pixel count for each category of color at the time of marking for output in the image path. Generally, with existing color detection and counting methods, a pixel will be labeled as color when the presence of any one of the C, M, and Y signals is detected. U.S. application Ser. No. 12/252,391 (published as Patent Application No. 2010/0100505 A1 on Apr. 22, 2010), filed Oct. 16, 2008 by the same Assignee (Xerox Corporation), which is hereby incorporated by reference in its entirety, proposes a way to count color pixels. In solid ink and ink jet products, however, it is desirable to render neutral gray objects with CMYK ink. This could substantially decrease the appearance of graininess in large uniform gray areas, such as a gray fill or sweep. For billing purposes, it is not desirable to charge customer for color pixels that were (are) supposed to be gray. The above-referenced '505 publication, for example, has limitations in handling images that are converted to contone from rendered binary data.

For copy path images, the C, M, and Y values of a pixel in a composite gray area could be quite different. In such images, many of these pixels can be labeled as color (although they may be rendered neutral gray), and thus counted as color pixels, which therefore skews the results used to determine the billing strategy. Such a classification may cause selection of a higher cost color billing strategy or a higher billing tier (selected from a multi-tier billing structure). Therefore, the customer may be billed for printing the document at a higher rate even though the output document reflects color pixels that are neutralized or gray.

Accordingly, an improved system and method of determining the amount of marked color content in a document and correctly billing customers is desirable.

SUMMARY

One aspect of the disclosure provides a processor-implemented method for determining a billing structure for outputting documents of at least one page using an image processing apparatus. The image processing apparatus has at least one processor for processing documents containing image data having a plurality of pixels. The method includes the following acts implemented by the at least one processor:

receiving image data of a document;

determining if the pixels in the image data in device independent space are neutral or non-neutral;

converting the plurality of pixels in device independent space into a plurality of pixels in device dependent space;

determining a billable pixel count of color pixels for the image data in device dependent space based on at least the determined neutral pixels in device independent space, and determining the billing structure for the image data of the document based on the billable pixel count.

Another aspect of the disclosure provides a system for determining a billing structure for outputting documents of at least one page using an image processing apparatus. The system has: an input device for receiving a document containing image data, the image data having a plurality of pixels; a plurality of processing elements associated with the image processing apparatus for processing the pixels of the image data into a device dependent space, each of the processing elements comprising an input and an output; and an output device for outputting a document. One or more of the processing elements is configured to: determine if the pixels in the image data in device independent space are neutral or non-neutral; convert the plurality of pixels in device independent space into a plurality of pixels in device dependent space; determine a billable pixel count of color pixels for the image data in device dependent space based on at least the determined neutral pixels in device independent space, and determine the billing structure for the image data of the document based on the billable pixel count.

Yet another aspect of the disclosure provides a non-transitory computer readable medium having instructions that, when executed by a computer, direct a computer to perform a method for determining a billing structure for outputting documents using an image processing apparatus. The method includes:

receiving image data of a document;

determining if the pixels in the image data in device independent space are neutral or non-neutral;

converting the plurality of pixels in device independent space into a plurality of pixels in device dependent space;

determining a billable pixel count of color pixels for the image data in device dependent space based on at least the determined neutral pixels in device independent space, and determining the billing structure for the image data of the document based on the billable pixel count.

Other features and advantages of the present disclosure will become apparent from the following detailed description, the accompanying drawings, and the appended claims.

BRIEF DESCRIPTION OF THE DRAWINGS

FIG. 8 illustrates a table showing exemplary features of counters used in accordance with an embodiment of the present disclosure;

FIG. 9 illustrates a table showing exemplary definitions corresponding to bit definitions for pixel tags in accordance with an embodiment of the present disclosure;

DETAILED DESCRIPTION

In order to increase the adoption of color usage in the marketplace, the following described system and methods provide better billing options for printing color pages. This disclosure proposes a method to solve the problem of charging customers a higher cost for printing pixels that are rendered neutral or gray with composite black ink or toner during processing. The billing structure is determined without counting the rendered neutral or gray pixels as color pixels (rather, e.g., as black/white pixels), and is at least partially based on determination(s) made in device independent space. This disclosure uses algorithms, methods, and processing elements (e.g., hardware) in multi-function systems/devices to determine a billing structure taking the above into consideration.

Throughout this disclosure, neutral and non-neutral (i.e., color) pixels are used as elements for determining billing structures (and/or estimating billing costs). The term "pixel" as used herein is defined as an element of data that may be provided in any format, color space, or compression state which is associated with or readily convertible into data that can be associated with a small area or spot in an image that is printed or displayed. Generally, a pixel is defined in terms of value (or brightness or intensity) and its position in an image. A pixel may be associated with an array of other small areas or spots within an image, including a portion of an image, such as a color separation plane. An image generally comprises a plurality of pixels having a number of components that contribute to defining the image when it is either printed or displayed.

The term "non-neutral" or "color" pixel as used herein is defined as a pixel that is intended to convey color information (e.g., when output or printed). With regard to some billing schemes, a color pixel is a pixel with one or more of its components (e.g. C, M, Y, K) on, and that, when combined with other (neighboring) pixels, gives the appearance of color. The term "neutral pixel" as used herein is defined as a pixel that is intended to convey black and white or gray information. With regard to some billing schemes, a neutral pixel is a pixel with one or more of its components (e.g. C, M, Y, K) on and that, when combined with other (neighboring) pixels, gives the appearance of black or gray.

The color spaces associated with device independent image data, device dependent image data, binary image data, and/or contone image data should not be limiting. For example, in an embodiment, device independent image data may be in L*a*b or RGB space. Similarly, for example, in an embodiment, device dependent image data may be in CMYK space.

Figure 1:
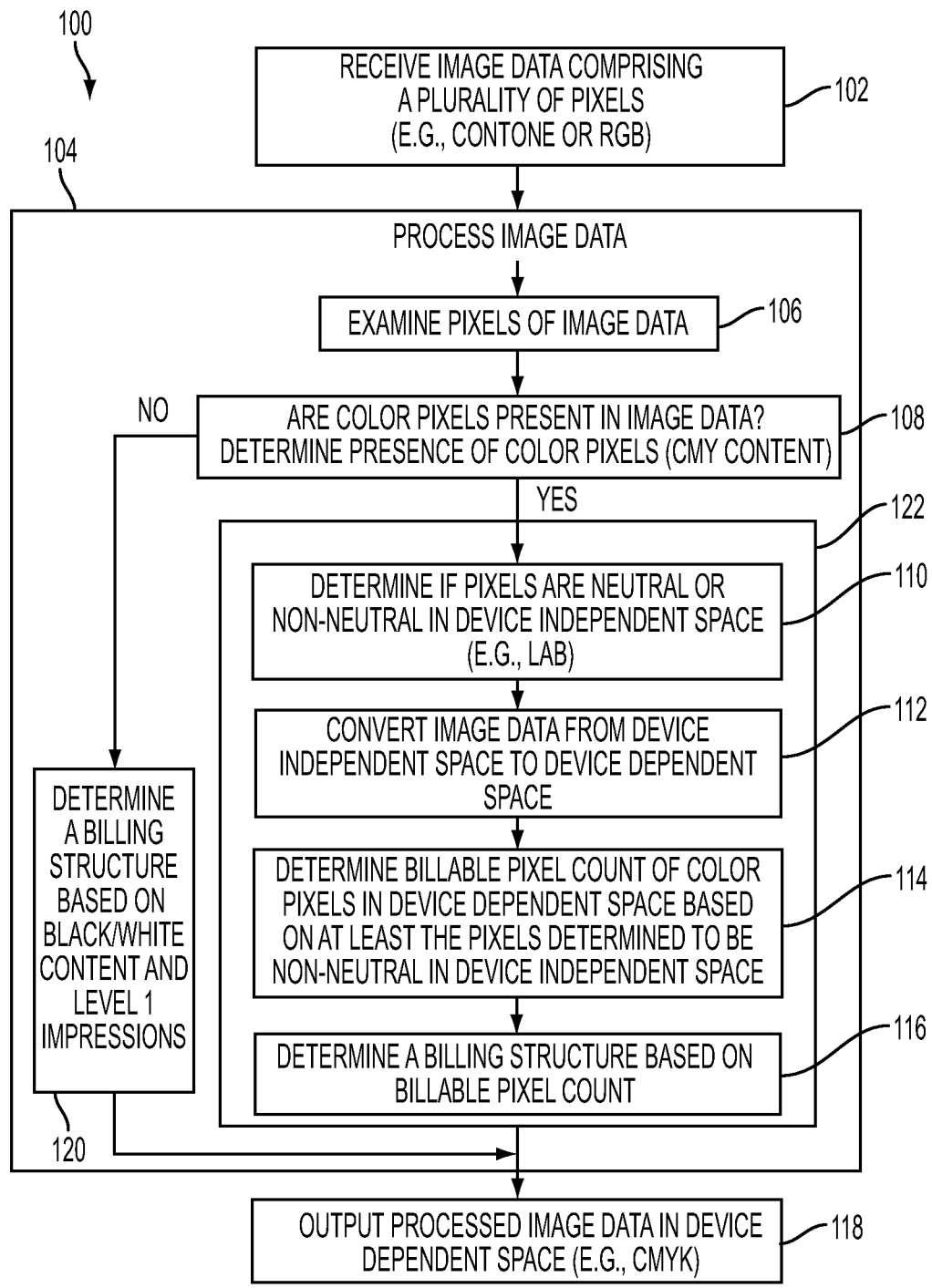
FIG. 1 illustrates a flow chart/block diagram illustrating a method for determining a billing structure for outputting documents in accordance with an embodiment of the present disclosure.

Generally, in known output systems/devices (e.g., printers, copiers, MFDs), when a document is to be printed, the document is input into a device and the image data is processed in an image path. For example, with reference to FIG. 1, image data comprising a plurality of pixels is received at 102 and processed at 104. Early in the image path when the image data is first processed, it is determined if the input image data comprises black and white (or gray) pixels of image data, i.e., no significant color image data in one or more color planes, or color pixels. FIG. 1 shows how the pixels of image data may be examined at 106. Then, in these known systems/devices, the image is determined to be a black and white or color image (e.g., based on a pixel count determined during marking of the image data for output) as shown at 108. Afterwards, a billing strategy for outputting the document is employed. In known systems the pixel count is typically an essentially pure count of color pixels, e.g., determining an amount pixels for each output color, whether or not composite black ink or toner is added during marking. For example, a binary CMYK domain is common in solid ink and/or other printing devices.

This disclosure, however, proposes a hybrid way of counting color pixels, so that pixels that are rendered neutral with the addition of composite black (i.e., in device dependent space or the binary domain during marking) are not counted as color when determining a billing structure for a customer or a user. Using existing hardware in the image/copy path, in this disclosure the neutral/color detection results in device independent space (or as provided by a controller) and in device dependent space (or as determined by the marking engine) are used to derive a billing structure/strategy for the image data (of a page or a document) being processed. Although there are two exemplary embodiments described herein, it is to be understood that such embodiments are not meant to be limiting, and that other methods or algorithms that use neutral pixel determination in combination with pixel counting for billing purposes are within the scope of this disclosure.

In order to reduce or prevent potential billing problems with regards to billing customers for color pixels that do not visually appear to the human eye to contain color, the present disclosure provides a method 100 for determining a billing structure for outputting documents based on a determined billable pixel count of the image data in the output document/page, as shown in FIG. 1. Generally, a billing structure is a method by which a charge to a user or customer for printing a document is calculated. A billing structure may be a calculation method associated with or correlated with tiers, thresholds, values, or algorithms, for example. Further details regarding tiered billing structures are discussed below with reference to blocks 202-212 in FIG. 2.

In the described example embodiments, the executed billing plans are designed to bill for color content (text, objects, areas) that only appears to be color to the human eye when output, and thus exclude the rendered neutral or gray pixels (and/or objects, neighborhoods, or areas of those pixels) that do not appear as color when calculating the billable pixel count for a document (or page). For example, even though some color ink or toner may be used to form grayscale image data, the billing structure may be chosen based on black printing modes. In some cases, a method for counting grayscale or composite black as black pixels, such as disclosed in U.S. application Ser. No. 12/246,956 (published as Patent Application No. 2010/0088201 A1 on Apr. 8, 2010), filed Oct. 7, 2008 by the same assignee, hereby incorporated by reference in its entirety, may be employed for processing grayscale image data that is received and processed by the methods disclosed herein. The exemplary embodiments herein are described with reference to counting non-neutral or color (CMY) pixels and without including types of rendered neutral or gray pixels in the billable count, but should not be limiting. The actual color of the pixel (or combination of colors, e.g., in a neighborhood or area) as determined in device independent space is used either directly or indirectly to determine the billable pixel count (and thus the selected billing structure).

Figure 13:
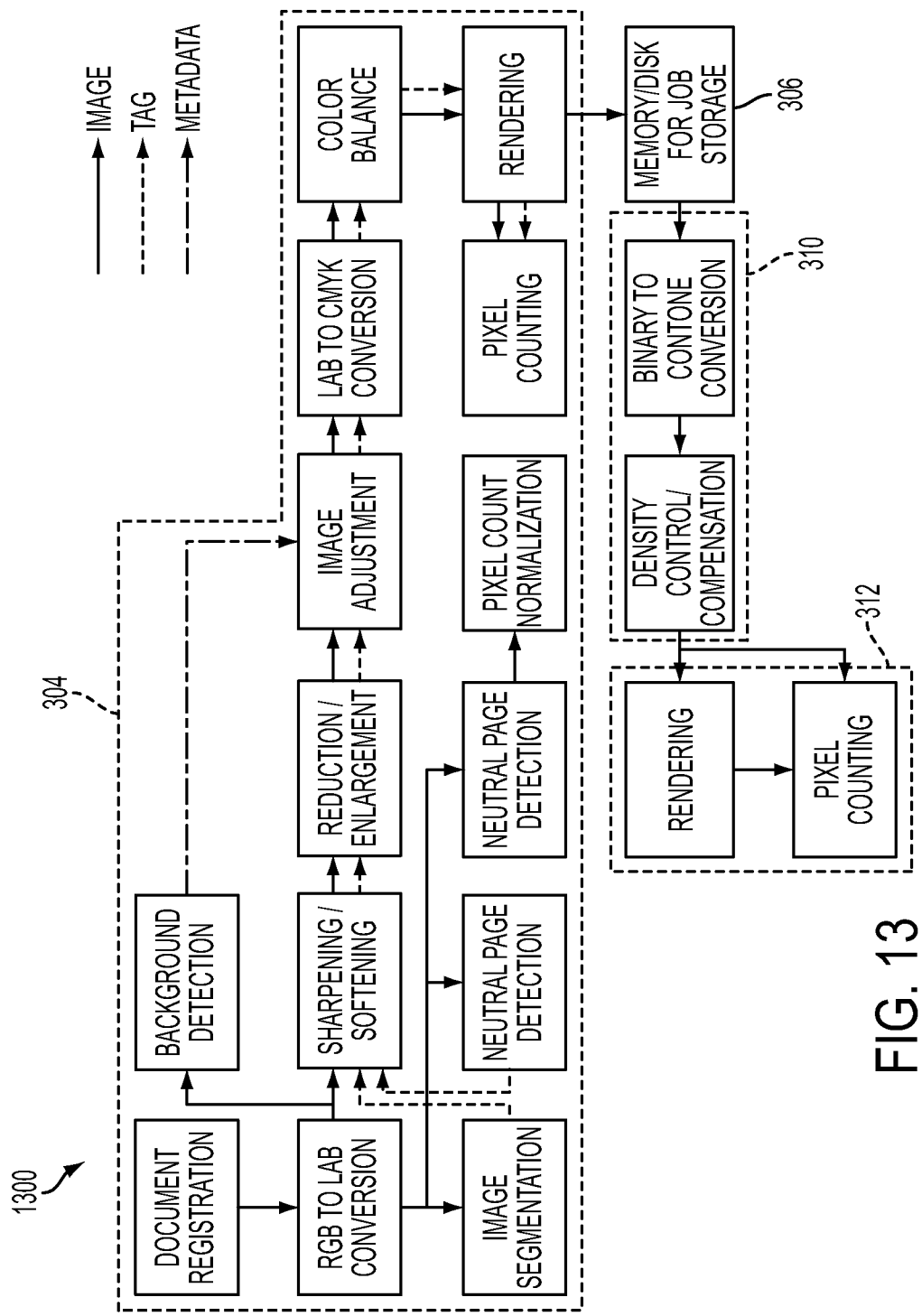
FIG. 13 illustrates a flow chart/block diagram illustrating exemplary processing modules in an image path of a system for implementing either or both the methods of FIGS. 3 and 6 in accordance with an embodiment of the present disclosure.

Referring back to FIG. 1, illustrated is a flow chart/block diagram illustrating a method for determining a billing structure for outputting documents in accordance with an embodiment of the present disclosure. Each of the method steps that are shown in FIG. 1 and throughout this disclosure may be implemented by a computer or a processor, for example, and are not meant to be limiting. For example, the elements or modules as shown in FIG. 13 may implement the herein described methods.

As previously noted, the method 100 begins at 102 in which an output device/image processing apparatus receives a document comprising at least one page of image data. The image data comprises a plurality of pixels. In some embodiments, the image data is received in device independent space. Alternatively, the image data may be in device dependent space. For example, the image data may be received in contone or RGB color space, or alternatively, comprise black and white pixels. The received image data in 102 is representative of any type of page or document and may include a variety of objects to be detected and used by method 100; however, method 100 may use a document that includes any combination of objects (including text). For example, the document may include objects such as monochrome color text object(s) and color text object(s).

After receiving image data in 102, the image data is processed at 104. Such processing may include transforming the input image data into device independent space, for example. The pixels of the image data for each page of the document are then examined at 106. At 108, a determination is made to determine the presence of color pixels in the page. If no color pixels or content are detected, then, at 120, a billing structure is implemented based on no color content in the page having been detected (e.g., based on black/white content and/or level 1 impressions). The print/copy job would thus be billed at one rate.

If, in 108, color content is detected (e.g., detect at least one color object is present in the page) in the page, then, at 122, a further examination of each pixel of image data is made to determine the billing structure, which may be based on color pixels. At 110, it is determined if pixels in the image data are neutral or non-neutral (i.e., color) in device independent space. For example, each pixel may be analyzed and/or compared to thresholds. Examples of methods for determining whether a pixel is neutral or color are described further below (e.g., see FIG. 6). However, the methods or steps for determining if a pixel is neutral or not should not be limiting. Any number of neutral pixel or neutral page determination methods may be implemented with this disclosure that currently exist or that are developed in the future.

After the image data is analyzed at 110, it may be further processed (as known in the art). It is converted from device independent space to device dependent space, as shown at 112. At 114, a billable pixel count of color pixels is determined in device dependent space. The billable pixel count is based on at least the pixels determined to be neutral in the device independent space. For example, as further described below, in one embodiment, the pixels that are determined to be neutral are not used in the billable pixel count, and, for a pixel that is determined to be color in device independent space and also in device dependent space, the pixel is determined to be color and may be counted for the billable pixel count. At 116, a billing structure is determined based on the billable pixel count.

Optionally, after the billing structure is determined at 116 or 120, the processed image data may be marked and output.

In the above method, the billable pixel count is used to determine the billing structure for outputting the page. The billing structures used with the image processing apparatus or output device should not be limiting. In an embodiment, it is envisioned that the billing structure(s) may be determined or based on a threshold value. For example, in an embodiment, the chosen or determined billing structure is based on the number of color pixels to be output/marked in device dependent space as compared to a threshold. In another embodiment, the determined billing structure is based on a ratio or percentage of color image data comprising an amount equal to or higher than a percentage threshold.

In another embodiment, the billing structure is based on a multi-tiered threshold value. The multi-tiered threshold value may be determined using the color coverage ratio or percentage on a page. That is, the color coverage may be measured or weighed with reference to an estimated total color value. Based on such measurements or weights, the page or document may be billed by choosing a billing structure associated with a tier (e.g., Tier-1, Tier-2, Tier-3) based on the number of satisfied thresholds. That is, one or more thresholds may be used to separate billing tiers which may be used to charge a customer. Such multi-tier bill plans provide options to the customer which better match types of printed documents and workflows. Additionally, two-tier and three-tier meter billing plans may replace black-only and color-only billing structures, which is more satisfactory for the customer and supplier.

Figure 2:
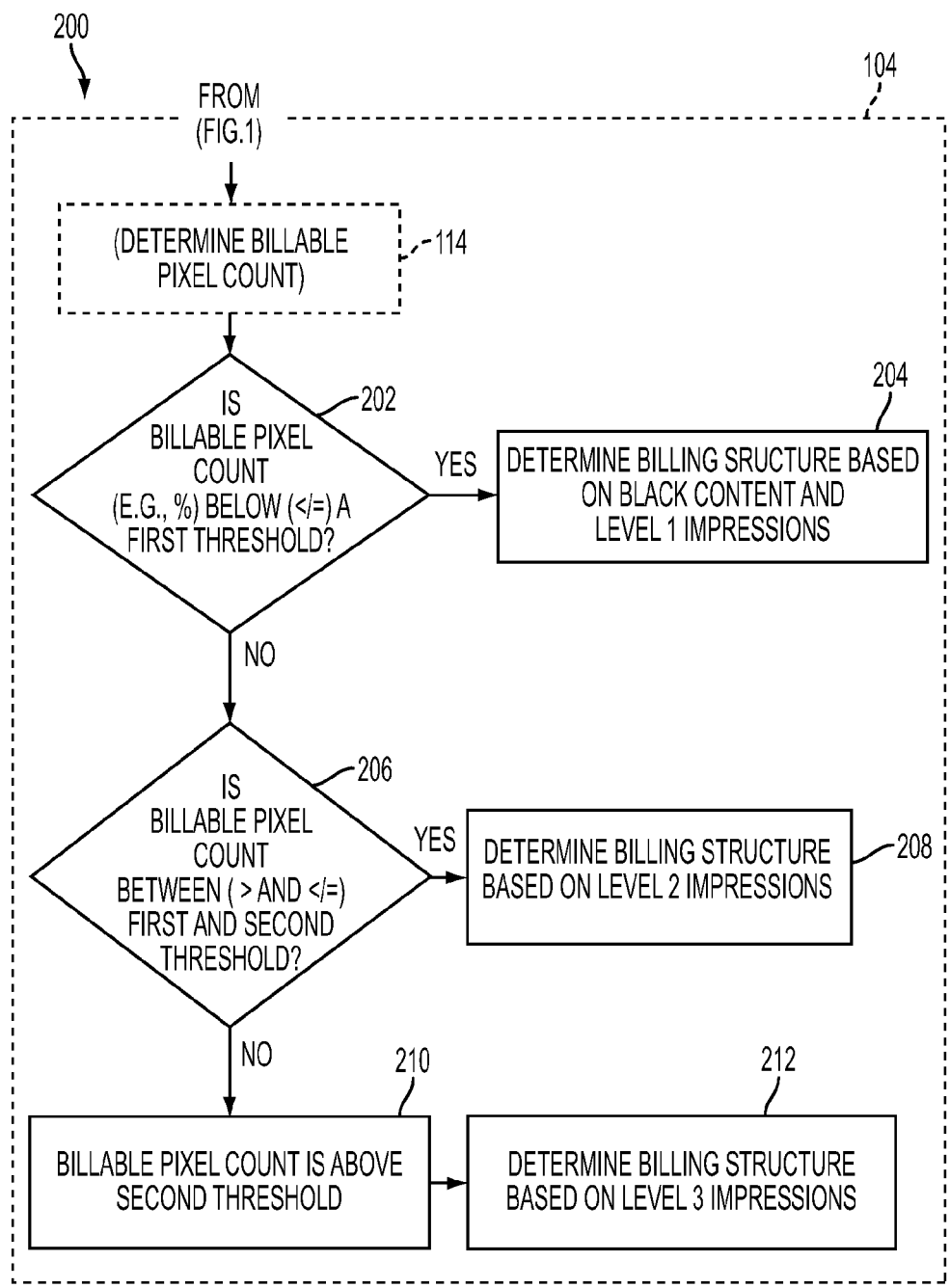
FIG. 2 illustrates an example of a method for determining a billing structure in a 3-tier threshold billing structure.

FIG. 2 illustrates an example of a method for determining a billing structure in a 3-tier threshold billing structure. For example, the 3-tier color distribution may include: expressive, useful, and everyday color use. In the illustrated embodiment, the three tiers may be defined as follows: Tier-1: all black and white documents and documents with a small amount of color are billed at black and white rate; documents with more than a small amount of color but less than a large amount of color are billed at a lower than market color impressions rate (everyday color, level 2 impressions); documents with large amounts of color are bill at a competitive market color impressions rate (expressive color, level 3 impressions). To determine or separate such tiers, breakpoints, percentages, or thresholds may be used. In the illustrated embodiment, the thresholds dividing the tiers may be percentages of color, based on the billable pixel count as compared to a total number of pixels, for example. However, the percentages or thresholds and the methods of defining the percentages or thresholds that are used to determine the tiers (e.g., ratio, percentage, pixel count) should not be limiting.

In any case, FIG. 2 illustrates one process 200 for determining the billing structure in 116 of FIG. 1. After the billable pixel count is determined at 114, it then is determined, as shown at 202, if the billable pixel count is below a first threshold. If yes, the billing structure is determined based on black content/level 1 impressions, as shown at 204. If the billable pixel count is not below a first threshold, i.e., no, but determined to be between the first and a second threshold as shown at 206, the billing structure for the page is determined based on level 2 impressions as indicated at 208. If the billable pixel count is not between the first and second thresholds, i.e., no, the coverage is determined to be above the second threshold at 210, and the billing structure for the page is determined based on level 3 impressions as shown at 212.

Figure 3:
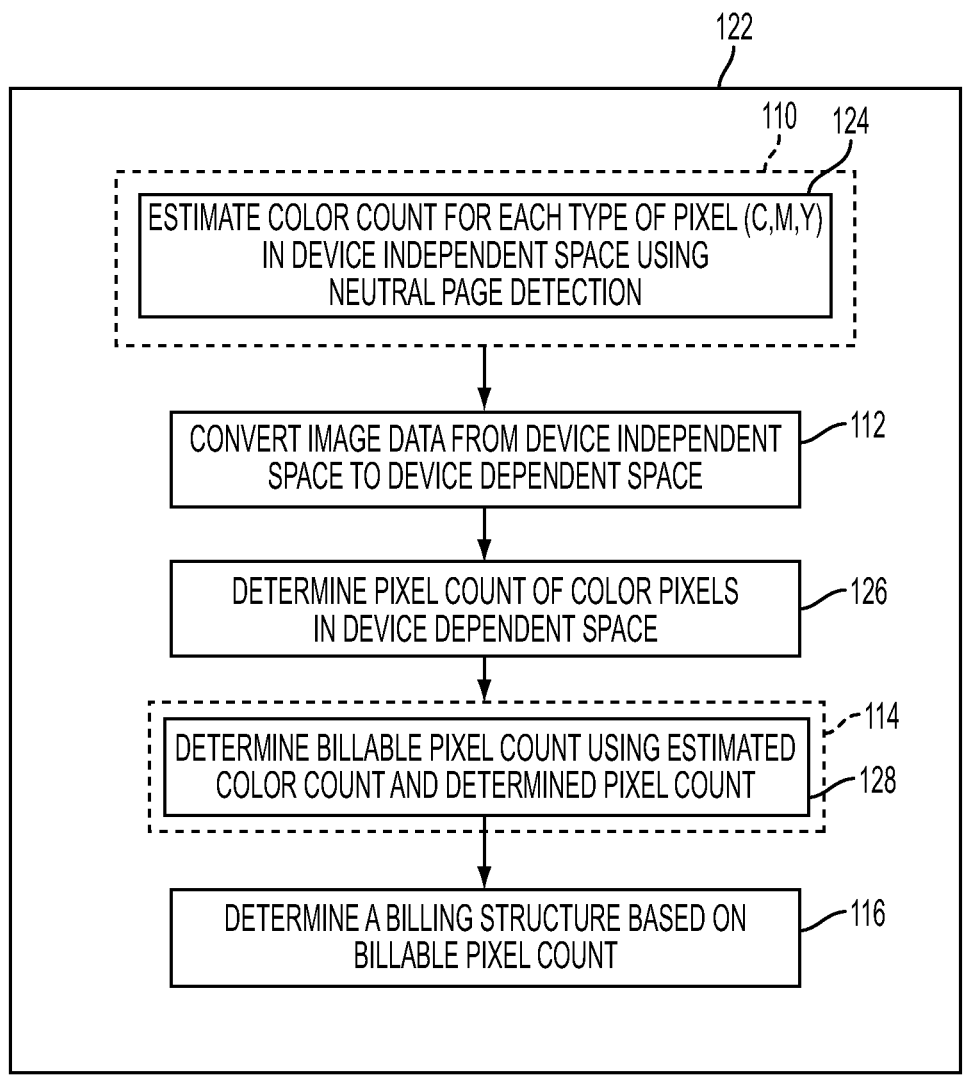
FIG. 3 illustrates a flow chart/block diagram illustrating a method for determining a billing structure using a neutral page determination in device independent space in accordance with an embodiment of the present disclosure.
Figure 6:
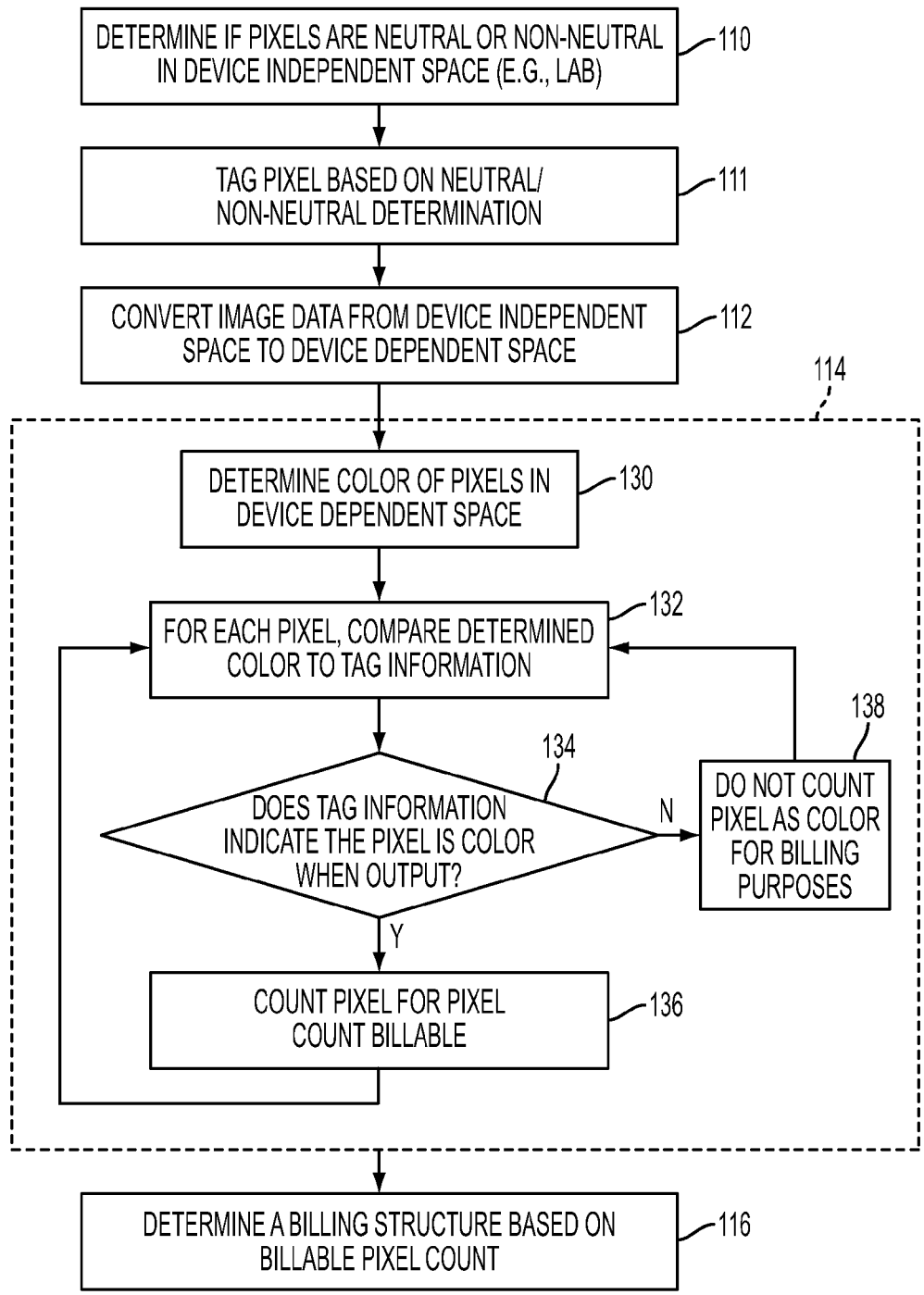
FIG. 6 illustrates a flow chart/block diagram illustrating a method for determining a billing structure using neutral pixel determination in device independent space in accordance with an embodiment of the present disclosure.

FIGS. 3 and 6 provide flow charts/block diagrams that illustrate in greater detail two embodiments which incorporate the steps for determining neutral/non-neutral pixels and using such data to determine a billable pixel count.

I. Neutral Page Detection

FIG. 3 shows steps for determining a billing structure using a neutral page determination in device independent space in accordance with an embodiment. For example, when further examination of the image data takes place at 122 in FIG. 1, the following steps may be implemented. As a part of the color pixel count determination process, the data collected in neutral page detection in device independent space may be used to estimate a color count in binary CMYK space, as shown at 124. Generally, neutral page detection methods are used to determine if a page contains color content or not. For example, pixels may be analyzed on a reduced image and using a window or neighboring pixels (of a pixel of interest) to determine if a pixel/page is detected as neutral or non-neutral. For example, in an embodiment, pixels may be compared against a set of thresholds, and a number of pixels exceeding the set of color thresholds may be determined. Those pixels that exceed the set of thresholds may be used for the estimated color count and to determine if a page is neutral. The neutral page operation is performed in device independent color space (such as L*a*b color space). An example embodiment of using a neutral page detection to estimate a color count in device dependent space is further described below with respect to FIG. 4.

After any further processing of the image data and its conversion into device dependent space, as shown at 112, the pixel count of color pixels in device dependent space may be determined at 126. Then, the billable pixel count of color pixels for the image data is determined by using both the estimated color count in device independent space and the determined pixel count in device dependent space at 114. For example, in one embodiment, the estimated color count of the determined color information is normalized and the determined pixel count in device dependent space is normalized. Then, a minimum of both normalized counts is determined for the billable pixel count. Generally, the estimated color count and the determined pixel count are combined to determine the billable pixel count.

The billing structure may then be determined at 116.

Figure 10:
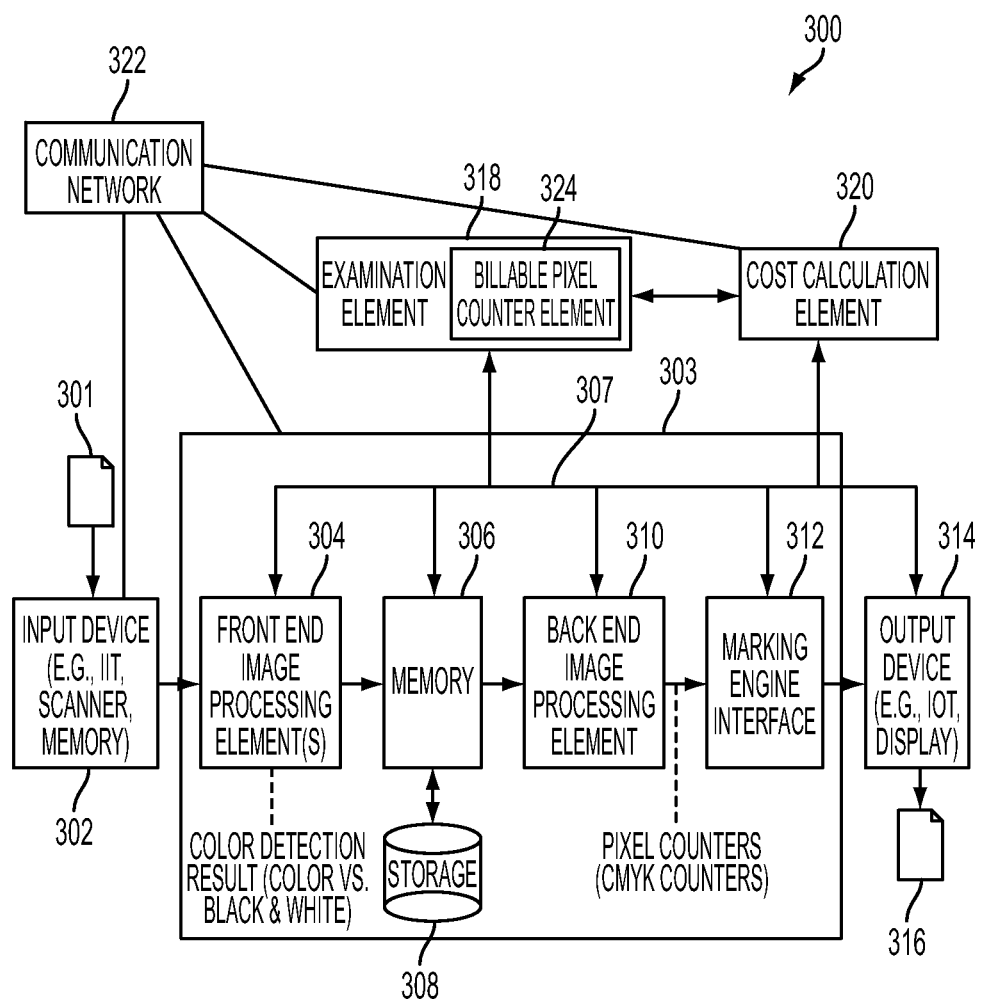
FIG. 10 illustrates a block diagram of an exemplary image path for processing image data in accordance with an embodiment of the present disclosure.

The description below discloses one embodiment that may be implemented by one or more modules in an apparatus for determining if image data is neutral or contains color objects as shown at 124 in the method described in FIG. 3. The detection may be performed by a controller or processor (e.g., front end image processing elements 304, as shown in FIG. 10) on a reduced image to save memory, for example. The neutral determination of pixels, however, is not limited to the below-described embodiment.

In this embodiment, the neutral and non-neutral pixels of a page (or document) may be determined based on determinations including image reduction, chroma calculation, luminance-based threshold adjustment, and a final count determination. Each determination may be performed (using modules or processing elements) as follows:

a. Image Reduction

The detection may be performed on a reduced CIELAB image. The image is reduced by 8× in the fast scan direction and by 4× in the slow scan direction. A 928×12 buffer is used to store the accumulated pixels. Essentially, in this exemplary embodiment, an average video value (for each of the three color image planes) is computed over discrete 8-pixel by 4 line scanline blocks i. Any pixels at the end of the line which are less than 8 in number are not used. Any lines at the end of the page which are less than 4 in number are not used.

For every discrete 8-pixel block in an input line, pixels are accumulated, rounded up and divided by two (e.g., to reduce memory requirements, halfSum is limited to 10 bits):

$$halfSum=(P_n+P_{n+1}+P_{n+2}+P_{n+3}+P_{n+4}+P_{n+5}+P_{n+6}+P_{n+7}+1)>>1,$$

where $n=i*8$; $i=0, 1, \ldots$

For each block, i, accumulate the block sum over four scanlines:

$$sumBuf[i]=sumBuf[i]+halfSum$$

In H/W, sumBuf[i] is held reset for the first scanline and for every 5th line which follows.

After the block sum is accumulated (sumBuf[i]) over 4 scanlines, calculate the average video value for that block by rounding up then dividing by 16 (note that each was previously divided by 2). Then:

$$avg[i]=(sumBuf[i]+8)>>4$$

Note that this average block value is only updated on every 4th scanline, once every 8 pixels, i.e., once the sum of a block of 8-pixels by 4 lines has been accumulated.

Note also that for each block location, i, there will be three average values, one for each color plane:

$avg\_L[i], avg\_a[i],$ and $avg\_b[i].$ b. Chroma Calculation

The chroma of each pixel block i in the reduced image is calculated as:

chroma[i]=max(|avg_a[i]−offsetA|,|avg_b[i]−offsetB|)+[min(|avg_a[i]−offsetA|,|avg_b[i]−offsetB|)]/2 where offsetA and offsetB are programmable values from 0 to 255. The value for the chroma is clipped to '63'.

c. Luminance-Based Threshold Adjustment

The chroma calculated for each pixel block is compared against a pair of thresholds, c1 and c2. The value of c1 is luminance dependent. The three most significant bits of avg_L[i] are used as the index to a programmable threshold LUT. The following is an example of possible LUT values:

| 3 MSBs of avg_L[i] | c1 |
|---|---|
| 000 | 9 |
| 001 | 8 |
| 010 | 7 |
| 011 | 6 |
| 100 | 6 |
| 101 | 6 |
| 110 | 6 |
| 111 | 5 |

The threshold, c2, is calculated as:

$c2=c1+deltaC$ where deltaC is a programmable value from 0 to 31
The range of c2 is limited to 0 to 47.

d. Final Determination

Two counters, count_n1, and count_n2, are used to record the number of pixel blocks that meet certain conditions. If the chroma value is between the two thresholds, c1 and c2, then we will increment the first counter count_n1. If the chroma value is greater than the second threshold, c2, then we will increment the second counter count_n2:

```
if (chroma[i] > c1 & chroma[i] <= c2)
    count_n1 ++
else if (chroma[i] > c2)
    count_n2++
```

The final decision is made by comparing the counter values to another threshold pair, thresh1 and thresh2. If count_n1 is greater than thresh1, or if count_n2 is greater than thresh2, the page is determined to be color. Otherwise, the page determined to be neutral. Both thresh1 and thresh2 are 16-bit numbers and are user-programmable. The value of these counters as well as the neutral page decision bit is available to be read by the host processor. These values are updated at the end of each page (or at the end of a windowed region) and are held until the end of the following page or are cleared via a module reset.

There may also be a status register update flag (address 0x00e) which may be read by the host processor. The flag is asserted high at the end of the windowed region or the end of the page (which ever comes first). When the flag is asserted, the values in the status registers (address 0x00b→0x00d) are valid. This flag will be de-asserted at the start of the next input page. An interrupt request will also be asserted on the rising edge of the status register update flag.

Referring back to FIG. 3, to determine the pixel count of color pixels in device dependent space at 126, a number of thresholds may be used to determine if pixels are neutral or color and should be counted. Below are two examples for determining pixel counts.

II. Color Pixel Counting in Marking Engine

The exemplary methods below may be performed using a marking engine or back end processing elements in the image path when the image data is in device dependent space. In the below-described embodiment, a count is first performed in the contone domain, and then in the binary domain. The contone domain count is used to determine the binary domain count. However, the combined results provide the determined pixel count of color pixels in device dependent space, as shown at 126 in FIG. 3.

1. In Contone Domain Before K to Composite Conversion

Figure 4:
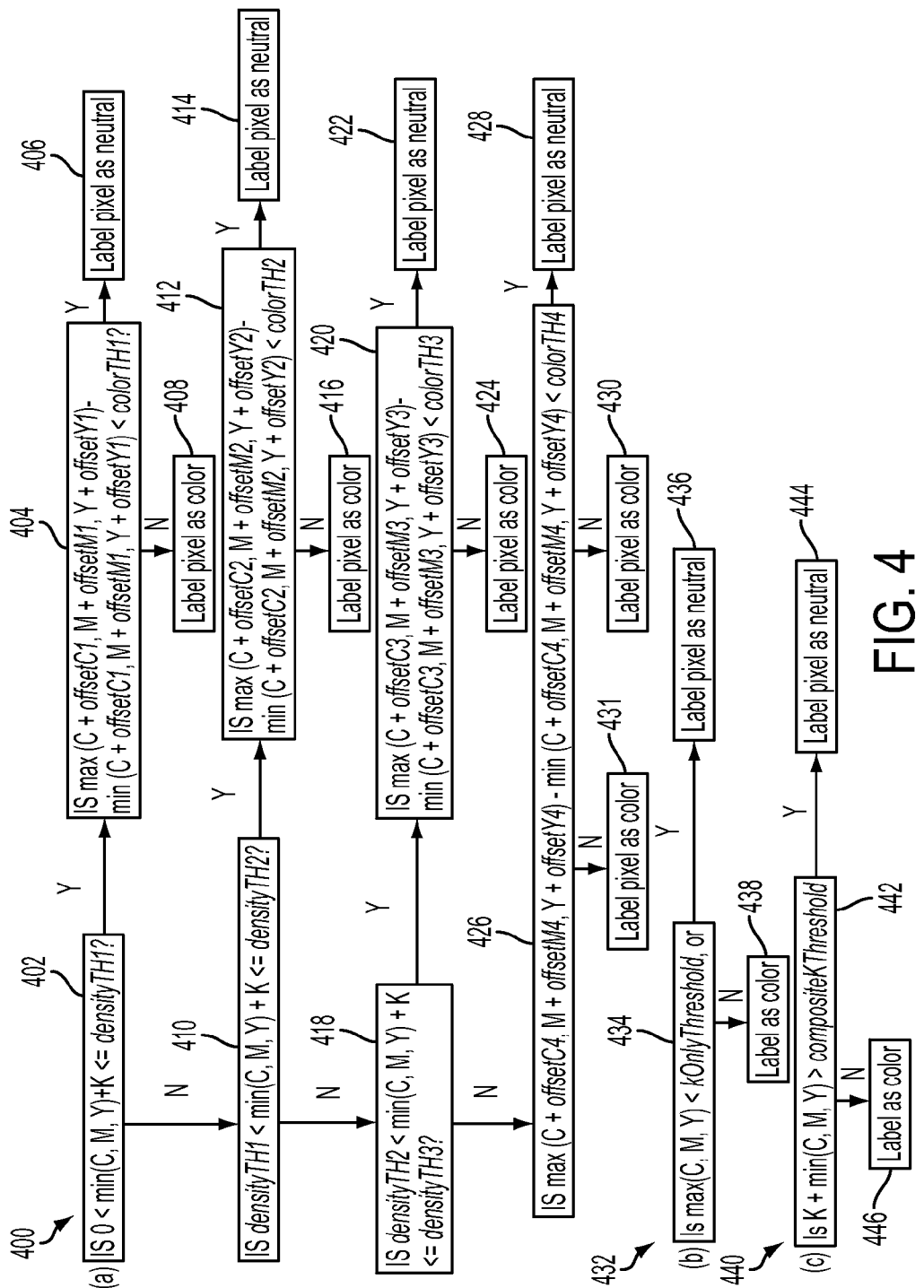
FIG. 4 illustrates an exemplary flow chart for determining in device dependent space whether pixels are neutral or non-neutral for counting in a marking engine in accordance with an embodiment.

In an embodiment, when image data is provided in composite CMYK color space, a neutral pixel detection method as illustrated by exemplary flow charts of FIG. 4 may be implemented to determine whether pixels are neutral or non-neutral (for purposes of controlling and/or adjusting pixel counting). A plurality of thresholds and offset values may be used to determine if pixels are neutral or color. For example, FIG. 4 uses a number of density thresholds densityTH1, densityTH2, etc., offset thresholds for each color (offsetC1, offsetC2, offsetM1, offsetM2, etc.), and color thresholds colorTH1, colorTH2, etc. for comparison. Other thresholds, such as for composite black (e.g., compositeKThreshold) may also be used for comparison.

In the first flow chart 400, indicated at (a), the comparison begins by determining if 0<min(C, M, Y)+K<=densityTH1 at 402. If YES, it is then determined if max (C+offsetC1, M+offsetM1, Y+offsetY1)−min (C+offsetC1, M+offsetM1, Y+offsetY1)<colorTH1 at 404. If YES, the pixel is labeled as neutral at 406. Else, if NO, the pixel is labeled as color at 408. If it is determined that 0<min(C, M, Y)+K is not <=densityTH1 at 402, i.e., NO, then it is determined if densityTH1<min(C, M, Y)+K<=densityTH2 at 410. If YES, it is then determined if max (C+offsetC2, M+offsetM2, Y+offsetY2)−min (C+offsetC2, M+offsetM2, Y+offsetY2)<colorTH2 at 412. If YES, the pixel is labeled as neutral at 414. Else, if NO, the pixel is labeled as color at 416. If it is determined at 410 that min(C, M, Y)+K is not >densityTH1 and <=densityTH2, i.e., NO, then it is determined if densityTH2<min(C, M, Y)+K<=densityTH3 at 418. If YES, then it is determined if max (C+offsetC3, M+offsetM3, Y+offsetY3)−min (C+offsetC3, M+offsetM3, Y+offsetY3)<colorTH3 at 420. If Yes, the pixel is labeled as neutral at 422. If NO, then the pixel is labeled as color at 424. Else, if it is determined that min(C, M, Y)+K is not >densityTH2 and <=densityTH3 at 418, then it is determined at 426 if max (C+offsetC4, M+offsetM4, Y+offsetY4)−min (C+offsetC4, M+offsetM4, Y+offsetY4)<colorTH4. If YES, then the pixel is labeled as neutral at 428. Else, if NO, the pixel is labeled as color at 430.

In the second flow chart 432, indicated at (b), if it is determined at 434 that max(C, M, Y)<kOnlyThreshold, then the pixel is labeled as neutral at 436. Else, the pixel is labeled as color at 438.

In the third flow chart 440, indicated at (c), if it is determined that K+min(C, M, Y)>compositeKThreshold at 442, then the pixel is labeled as neutral at 444. Else, the pixel is labeled as color at 446.

Although not specifically shown in FIG. 3 or FIG. 4, in an embodiment, the determination of neutral or non-neutral (color) may be relayed in the form of applying a tag to each pixel. For example, each pixel may be labeled using a tag. In an embodiment, information associated with the tags comprises indicating if a pixel is neutral or color. In another embodiment, tags may only be provided on pixels that are neutral, or only on pixels that are color. Information associated with a tag should not be limiting. Tag information may be used, for example, to determine the billable pixel count of color pixels in the binary domain (device dependent space).

2. In Binary Domain where Pixel Counting is Done

Figure 5:
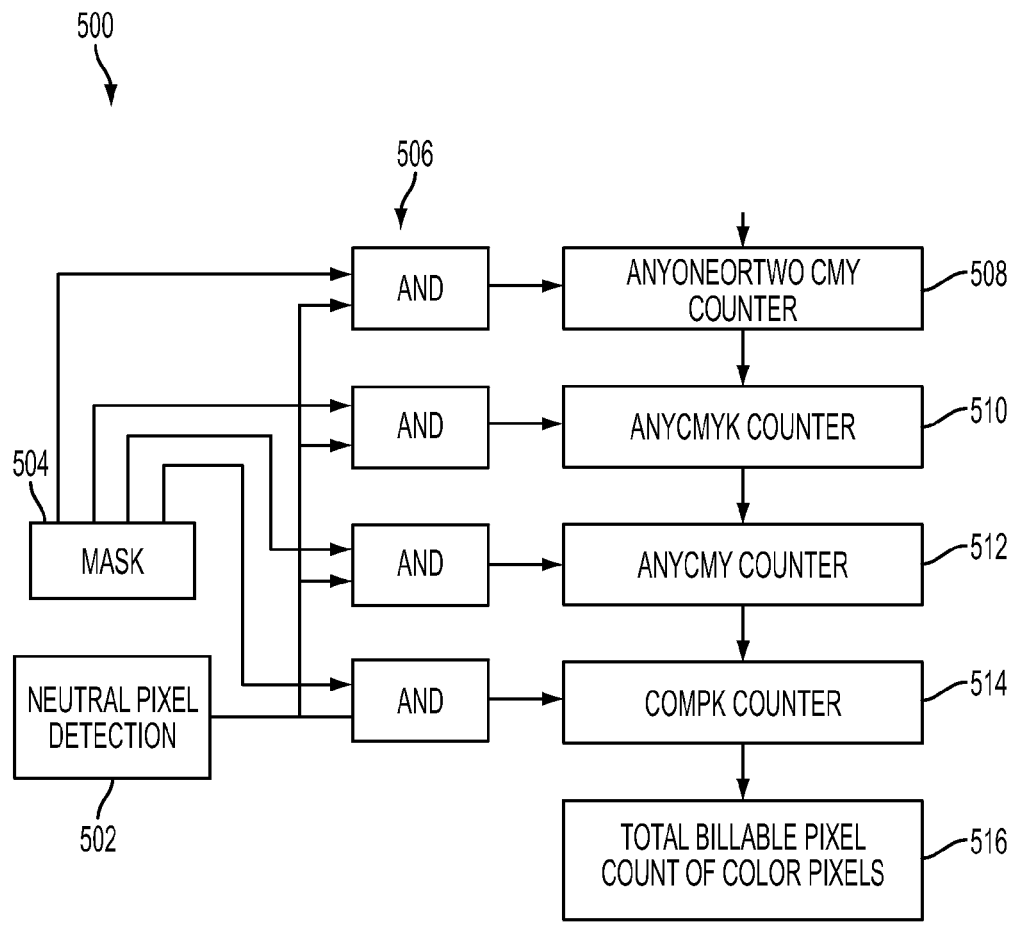
FIG. 5 illustrates exemplary control diagram of counters for pixel counting in device dependent space (binary domain) based on neutral/non-neutral pixel determination.

FIG. 5 illustrates exemplary control diagram 500 of counters for pixel counting in device dependent space (binary domain) based on neutral/non-neutral pixel determination. For example, the following counters may be provided: AnyOneOrTwoCMY counter 508, AnyCMY counter 510, AnyCMYK counter 512, ComK (composite black) counter 514. In an embodiment, a 4-bit programmable counterMask 504 may be provided that works together with a neutral pixel determination or detection (e.g., indicated via tag(s)) to control the counters 508-514. The mask contains 4 bits with each bit corresponding to one of the added counters. In the illustrated embodiment, neutral pixel detection data is combined with mask information 504 at 506, and one or more of the counters 508-514 may be incremented based on the determination. For example, if the neutral pixel detection data 502 when combined with mask information 504 indicates that a pixel is a color pixel of C, M, or Y, the anyCMY counter 512 will be incremented (i.e., the pixel will be counted). If a pixel is labeled as neutral (e.g., using the method of FIG. 4) and the corresponding mask bit is on, then the counter will not be incremented. The mask can be used to specify which counters are controlled by the neutral/non-neutral pixel detection tag (e.g., if a mask bit corresponding to a specific counter is set to zero, the control from a neutral pixel tag would be disabled). However, a mask need not be provided. Each count of the counters 508-514 may be used to determine the total billable pixel count of color pixels, as indicated by 516.

In an embodiment, the neutral/non-neutral pixel detection image data 502 is determined using the method illustrated and described in FIG. 4.

In this illustrated embodiments of FIG. 5, each counter 508-514 is a counter that is tag control enabled. However, it is to be understood that other counters may be provided that do not use tag control (e.g., such as ones for tracking ink consumption only).

In another embodiment, the billable pixel value determination (or billable pixel count) may be determined based on using neutral pixel detection information obtained in device independent space to control the counting of color pixels in device dependent space. The details of tag controlled pixel counting are shown in FIG. 6. Tag controlled pixel counting may improve area coverage based color pixel counting for copy path images. For example, when further examination of the image data takes place at 122 in FIG. 1, the following steps may be implemented. At 110, the pixels may be determined to be neutral or non-neutral in device independent space. Again, any number of methods may be utilized for such a determination. In one embodiment, a neutral pixel determination method issued the determination 110. U.S. Patent Application Publication 2009/0226082 A1 (U.S. application Ser. No. 12/042,370), filed Mar. 5, 2008, published Sep. 10, 2009, and assigned to the same assignee (Xerox Corporation), and which is herein incorporated by reference in its entirety, discloses one exemplary neutral pixel detection method that may be used for the determination at 110.

Pixels may be tagged as shown at 111 based on the neutral or non-neutral determination. In an embodiment, information associated with the tags comprises indicating if a pixel is neutral or color. In another embodiment, tags may only be provided on pixels that are neutral, or only on pixels that are color. The information associated with the tags should not be limiting.

After any further processing of the image data and its conversion into device dependent space, as shown at 112, the color(s) of the pixels in device dependent space are determined as shown at 130. Then, for each pixel, the determined color in device dependent space is compared to color information (or neutral information) provided by the tag, as shown at 132. It is then determined if the tag information indicates that the pixel is color when output at 134. For example, if the determined color in device dependent space for a selected pixel is color and the tag indicates, that the selected pixel is color, i.e., YES, then the selected pixel is counted for the billable pixel count. Otherwise, the selected pixel is not counted as color for billing purposes (e.g., it may be rendered visibly neutral to the human eye) for the billable pixel count, as shown at 138. After the billable pixel count is determined at 114, then a billing structure is determined at 116.

Figure 7:
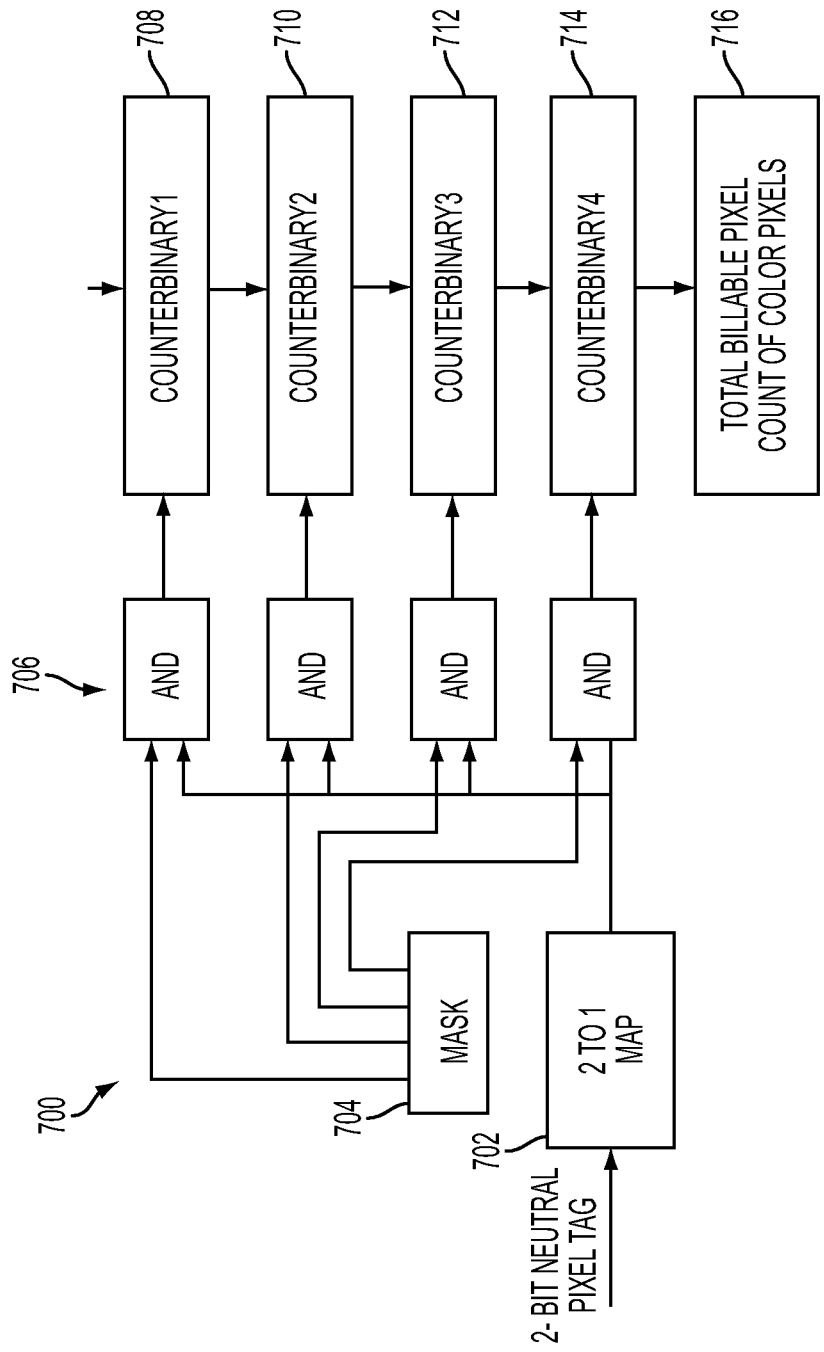
FIG. 7 illustrates exemplary control diagram of counters for pixel counting in device dependent space (binary domain) based on tags.

FIG. 7 illustrates exemplary control diagram 700 of counters for pixel counting in device dependent space (binary domain) based on neutral pixel determination in device independent space. Specifically, the illustrated diagram uses information from the tags applied at 11 in FIG. 6 for counting purposes. In the embodiment of FIG. 7, 2 to 1 mapping block 702 may be optionally provided for pixel counting. For example, in some implementations, the neutral pixel detection tag has 4 states (e.g., true neutral, fuzzy neutral, fuzzy color, and true color). The 2 to 1 mapping block 702 is used to make a decision as to which are mapped to neutral and which are mapped to color. In some systems, however, the neutral pixel detection may generate only a binary tag (neutral or color). In these cases, the 2-to-1 bit mapping is not needed (and thus block 702 need not be provided).

The following counters may be provided: Binary 1 counter (e.g., C) 708, Binary 2 counter (e.g., M) 710, Binary 3 counter (e.g., Y) 712, and Binary 4 counter (e.g., K) 714. The counters are controlled by neutral pixel detection tag as well as a programmable mask. In an embodiment, a 4-bit programmable counterMask 704 may be provided that works together with a 2-bit tag (neutral pixel) determination to control the counters 708-714. The mask contains 4 bits with each bit corresponding to one of the added counters. The 2-bit neutral pixel tag is mapped to a 1-bit tag. In the illustrated embodiment, neutral pixel detection/tag data is combined with mask information 704 at 706, and one or more of the counters 708-714 may be incremented based on the determination. For example, if the tag data at 702 indicates a color pixel when combined with mask information 704 (e.g., a color pixel of C, M, Y, or K), the associated binary counter will be incremented. However, if both the 1-bit neutral pixel flag and the mask bit are on, then the corresponding counter will not be incremented. Each count of the counters 708-714 may be used to determine the total billable pixel count of color pixels, as indicated by 716.

In this illustrated embodiment of FIG. 7, each counter 708-714 is a counter that is tag control enabled. However, it is to be understood that other counters may be provided that do not use tag control (e.g., such as ones for tracking ink consumption only). Tables 1 and 2, illustrated in FIGS. 8 and 9, give further details with regard to types of tag-control counters 708-714 and bit definitions, respectively, that may be provided in an exemplary embodiment.

As shown in Table 1, any of the Binary counters may comprise a U32.0 or U29.0 format. A control device (not shown in FIG. 7) may also be provided. The control device may be a programmable register that is used to control the counters, i.e., how the counting of pixels is controlled. For example, bits in the control register may be used to specify the 2-to-1 mapping described above. The control device may comprise a U8.0 format.

The Binary 1 counter 708 may count color pixels wherein any one or two of C, M and Y flags is on and K is off. The Binary 2 counter 710 may count pixels wherein K flag is on but the rest of the colors (C, M, Y) are off. The Binary 3 counter 712 may count pixels wherein all C, M and Y flags are on, but K is off. The Binary 4 counter 714 may count pixels wherein the K flag is on, but not the only flag that is on.

FIG. 8 illustrates a table showing exemplary definitions corresponding to bit definitions for pixel tags that may be used in accordance with an embodiment of the present disclosure. Table 2 shows 8 bits (0-7) that may provide information via tags for controlling a pixel count. For example, as shown, bit 0 may specify what a neutral pixel tag of "00" should be mapped to. Bits 4-8 may be a mask bit corresponding to any one of the binary counters.

The above-described exemplary methods are exemplary and illustrate two examples of hybrid ways of using processed information from both the device independent space and device dependent space to count or calculate color pixels for output so that pixels that are rendered neutral (and not visibly color to the human eye when output) are not counted when determining a billing structure. In copy path images, for example, many pixels in a composite gray area may be typically labeled as color and skew billing detection results. However, the above-described methods improve the color detection for billing. From a customer point of view, the methods disclosed herein not only avoid the mistake of billing a neutral page or gray pixels as color, but also determined an accurate billing structure based on visibly output color.

The herein described methods may be used by any MFD (or printer or copier) manufacturing companies that wish to implement image paths capable of rendering pixels neutral with composite black without counting these pixels as color in billing.

FIG. 10 illustrates a block diagram of an example of an image path 300 for processing image data of a system, device or image processing apparatus 303, such as an MFD. The system/device/apparatus 303 comprises, among other devices, an input device (e.g., IIT or memory) 302, a processor or processing elements represented by 304 and 310, a memory 306 and/or a storage device 308, and an output device (e.g., IOT) 314 and/or marking engine interface 312. The image path 300 of the system 303 may also include an examination element 318 and/or cost calculation element 320 which may be a part of the system 303 itself or in communication with the processing elements 304 and 310, for example. Generally, the above elements (as will be described) of the device are provided to perform functions that assist in receiving image data such as a scanned document, configuring the image path of the processing elements 304 and 310 (and possibly elements 318 and 320) to process the image data, and, if needed, outputting the image data such as by printing a document according to an output mode that may be selected. However, it should be noted that the apparatus or device may comprise additional elements not described herein or alternative elements for performing similar functions, and should not be limited to those elements as illustrated in FIG. 10. Generally, the image path shown in FIG. 10 corresponds to any number of output modes that may be selected for an image processing apparatus, system, or device.

The input device 302 is used to deliver image data of a document to the system 303 and/or processing elements in the image path. In some embodiments, the input device 302 is used to scan or acquire an input document 301 or page into image data, such as when copying a document, for example. The input device 302 may be a digital scanner, for example. Generally, however, any device used to scan or capture the image data of a document for an image processing apparatus may be used. For example, the image data may be captured by a scanner in a copier, a facsimile machine, a multi-function device, a camera, a video camera, or any other known or later device that is capable of scanning a document and capturing and/or inputting electronic image data. The input device 302 may include submission of electronic data by any means and should not be limiting. In other embodiments, the input device 302 may be an electronic device for inputting electronic image data. In some embodiments, input device 302 may be connected to a network 322 or telephone system, for example, to receive as input image data such as via a facsimile (fax) machine or computer (CPU). Input documents and/or image data that is received electronically may be received via a telephone number, an e-mail address, an Internet Protocol (IP) address, a server, or other methods for sending and/or receiving electronic image data. The network may be a digital network such as a local area network (LAN), a wide area network (WAN), the Internet or Internet Protocol (IP) network, broadband networks (e.g., PSTN with broadband technology), DSL, Voice Over IP, WiFi network, or other networks or systems, or a combination of networks and/or systems, for example, and should not be limited to those mentioned above.

If needed, the input or received image data may be converted using the input device 302 and/or processing elements in the apparatus 303. For example, in embodiments, the image data may be converted from device dependent space to device independent space (e.g., RGB to L*a*b). Alternatively, the image data may be received in device independent space (e.g., L*a*b or PostScript). The type of image data received and the type of input devices documents are received therefrom should not be limiting.

In any case, image data, such as image data for an original document 301, may be received or input in either device dependent or device independent space from the input device 302, depending on the capability of the input device or the architecture of the system. The input device 302 may capture image data as binary or contone image data, for example. Generally, when the input image data from the input device is received in device dependent space, the processing elements in the image path will typically convert such image data to some device independent space for further processing before converting the image data to device dependent space (e.g., to be output). The input and output devices deal with different device dependent color spaces, and most of the image processing in the image path 300 is performed in a device independent space to produce output images of the highest possible quality.

Figure 11:
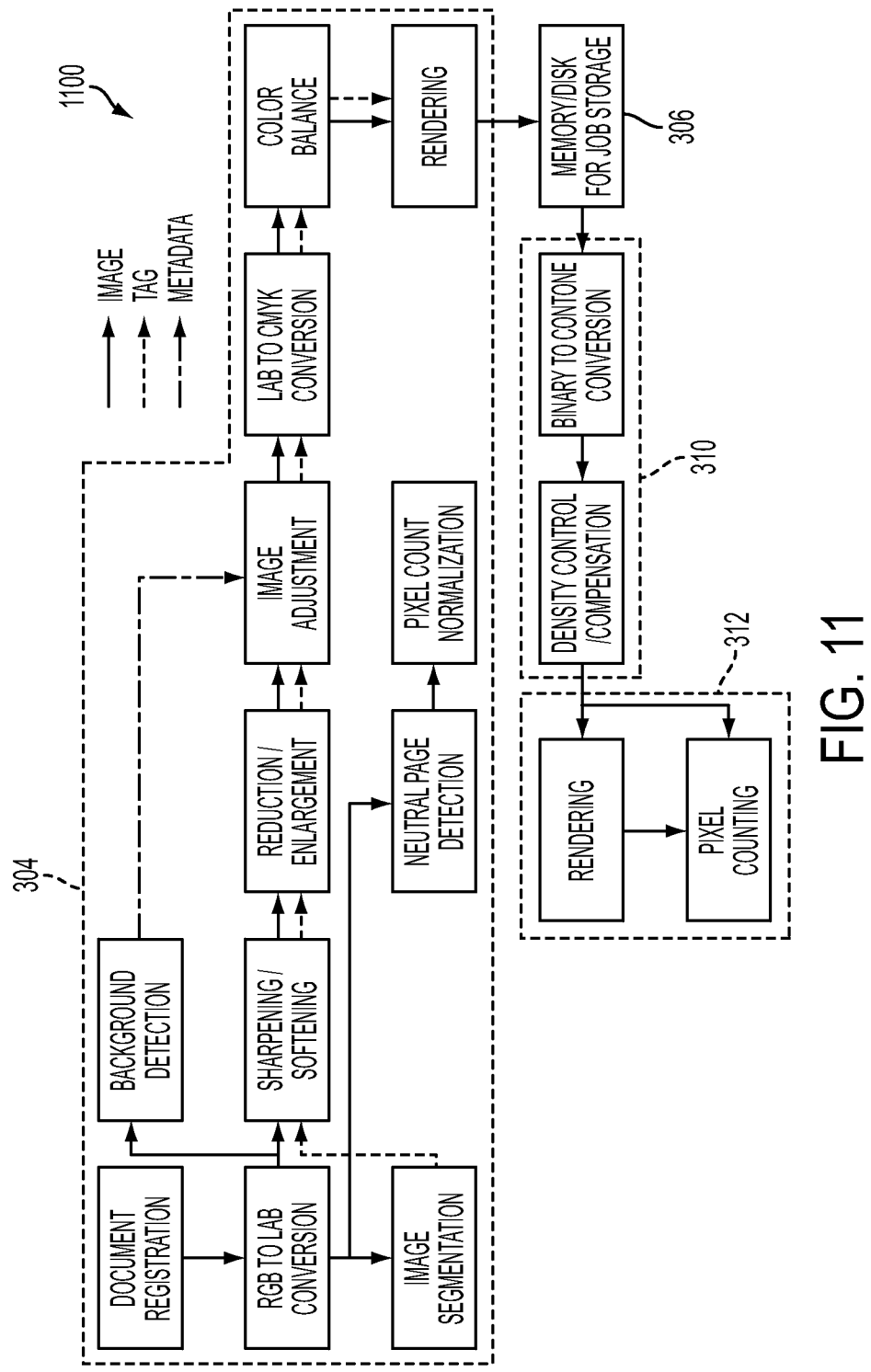
FIG. 11 illustrates a flow chart/block diagram illustrating exemplary processing modules in an image path for implementing the method of FIG. 3 in accordance with an embodiment of the present disclosure.
Figure 12:
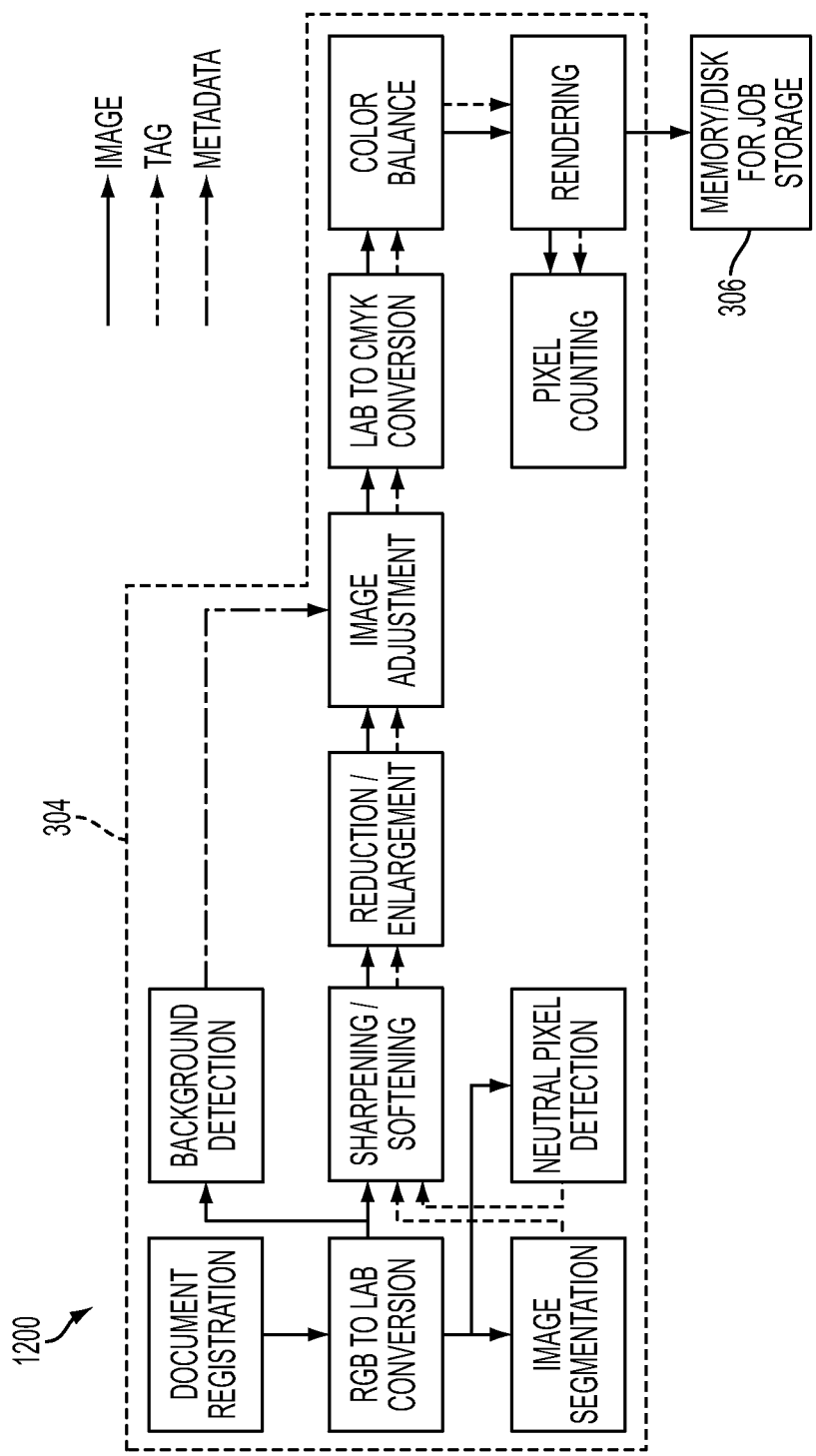
FIG. 12 illustrates a flow chart/block diagram illustrating exemplary processing modules in an image path for implementing the method of FIG. 6 in accordance with an embodiment of the present disclosure.

FIG. 10 also shows a processor or processing elements for processing and/or manipulating image data using a plurality of operations and/or processes. The description of the processing elements below is an example of devices capable of implementing processes to be performed and should not be limiting. For example, additional processing elements may be provided along the image path 300 (such as shown in FIGS. 11, 12, and 13). Additionally and/or alternatively, additional operations may be performed on the image data other than or in addition to those described with reference to these figures.

The image path 300 of system 303 may comprise a plurality of image processing elements (or processor) for manipulating image data received from the input device 302 using a plurality of operations and/or processes. The processing elements may be a combination of image processing elements which comprise software and hardware elements that perform a number of operations on the image data received from the input device 302 (e.g., IIT/scanner, memory, or other source) using a set of parameters. The parameters are used to convert the images to the format desired as output (e.g., high quality) along the image path. The processing elements may be a part of a computer system, device, or apparatus such as a xerographic system, a photocopier, a printing device, or a multi-function device (MFD). For simplicity purposes, the term "processing element" throughout the application will refer to one or more elements capable of executing machine executable program instructions. It is to be understood that any number of processing elements may be used and that additional operations or processes besides those described below may be provided in an image path.

More specifically, the image path of FIG. 10 comprises a front end processing element(s) 304, a memory 306, storage 308, and a back end processing element(s) 310. Each of the devices or elements in the image path may be communication with each other, as represented by path 307. The front end processing element(s) 304 may comprise any number of processing elements/modules and is/are image processing elements that receive image data in a beginning of an image path and is/are used to process the image data according to user preferences such that it may be stored and later retrieved for output. The back end processing element(s) 310 may comprise any number of processing elements/modules and is/are generally used at the end of an image path to retrieve stored image data and to process the image data such that the image data may be output to a printing device as an accurate recreation of the original input or scanned image. Of course, processing elements may also be used for compression and/or decompression of image data.

In an embodiment, one or more of the elements (e.g., processing elements 304, 310 and memory 306/storage 308) of system 303 may be connected to a network 322 or telephone system, for example, for communication with other devices, systems, or apparatuses. For example, in some cases, image data or executable instructions may be provided via a computer (CPU) connected to the network 322. As further described below, in a possible embodiment, at least one processing element of system 303 may implement an operative set of processor executable instructions of a billing system. Such a billing system or the executable instructions may be provided via the network 322, for example.

Each of the image processing elements comprises an input and an output. Additionally, the system, device, or apparatus may also include one or more controllers or routers (not shown) to select and route the image data between the processing elements 304 and 310 and memory 306 and/or storage 308, and other elements described below, for example.

Front end processing element(s) 304 receives (e.g., as input) the image data from the input device 302 and processes the image data. The image data may be received as input via a scanning engine interface, for example, such as when copying and turning a hard copy document into image data. Alternatively, the image data may be received electronically, such as from a memory device, storage device (portable or remote), et al., such as when printing a saved document. As such, the form in which image data is received should not be limiting. Front end processing element(s) 304 may be used to process the scanned image data as well as determine user-defined operations generally known in the art. For example, the front end processing element 304 may be used for color space conversion, reduction or enlargement, document registration, and/or performing other operations or processes on the image data, for example. FIGS. 11, 12, and 13 illustrate examples of types of processing elements or modules that may be in image path 300 of the image processing apparatus in accordance with an embodiment. In some embodiments, the front end processing element 304 converts the image data (e.g., from device dependent to device independent image data, when received via a scanner) for processing and determines neutral and non-neutral pixels. In the herein disclosed method, front end processing element 304 may be used (alone or in cooperation with other elements) to determine a billing structure, such as noted at 116 of the method 100 in FIG. 1.

Memory 306 and/or storage 308 may be used to store image data. For example, memory 306 and/or storage 308 may be used to temporarily store the original image data of document input via input device 302. Converted (e.g., binary to contone image data) or compressed image data may also be stored in the memory 306 and/or storage 308. Memory 306 and/or storage 308 may be used to store machine readable instructions to be executed by the processor/processing elements. The memory 306 and/or storage 308 may be implemented using static or dynamic RAM (random access memory), a floppy disk and disk drive, a writable optical disk and disk drive, a hard disk and disk drive, flash memory, or the like, and may be distributed among separate memory components. The memory 306 and/or storage 308 can also include read only memory, or other removable storage drive(s) or memory devices.

The front end processing element(s) 304 may communicate with memory 306 and/or storage 308 of system/apparatus 300 to store processed and/or compressed image data, for example. Compressed image data may be stored in memory 306 and/or storage 308 temporarily or for a later time when needed. When the image data is needed or it is time for marking (e.g., using the marking engine interface 312 or output device 314), the image data may be retrieved from memory 306 and/or storage 308 via the back end processing element(s) 310 to export the image data that has been scanned, for example.

Back end processing element(s) 310 receives processed image data from the memory 306 or storage 308. Back end processing element(s) 310 may be used to further render the image data for output. For example, back end processing element 310 may be used to convert the color space of the processed image data (e.g., convert from device independent CIE L*a*b color space to device dependent CMYK color space), provide color balance, further rendering, filtering, and/or other operations or processes. FIGS. 11, 12, and 13 also illustrate examples of types of processing elements or modules that may be in image path 300 of the image processing apparatus in accordance with an embodiment. Subsequently, back end processing element(s) 310 may be used to decompress the image data and output the image data via the IOT 312 and/or output device 314. The output of processed image data from the back end processing element 310 depends on the image path (or output mode). The back end processing element(s) 310 may be used for calculating the amount of CMY color coverage/pixel locations and/or to determine the toner/ink consumption of the output device 314.

In an embodiment, the processed image data may be directly output to the marking engine interface 312 for printing using an output device 314. The marking engine interface 312 and/or output device 314 may be associated with a printer, a copier, or an MFD which is used for printing documents. In some cases, the marking engine interface may be a part of the output device 314. The marking engine interface 312 and/or output device 314 are used to output the processing image data to the printer, for example. Specifically, the marking engine interface 312 may be designed to receive the reconstructed and processed image data in device independent space in order to send or output the image data to the output device 314 (e.g., printer) for a copy or print job. The marking engine interface 312 may further perform image processing on the image data to make corrections or compensate for deviation in the printing process. Alternatively, the back end processing element(s) 310 may be used to perform further image processing on the image data.

The marking engine interface 312 outputs processed image data to the output device 314 for outputting the image data of the document. The type of output device 314 should not be limiting. For example, the output device 314 may comprise an image output terminal (IOT), display, screen, printing device, copying device, MFD, or others devices, as generally noted above. The display or screen may be a part of a computer (CPU) or user interface (UI) or may be provided to relay information from a website or other device via a network 322, for example. In some cases, a UI may be provided directly on the apparatus/device, while in others a UI is provided as a separate electronic device.

In an embodiment, the processed image data may be output to a printer (e.g., drum or roll for applying to paper) to complete the image path, for example. Of course, the algorithms and processes used by the elements in the image path shown in FIG. 10 should not be limiting. Any number of data compression algorithms (e.g., lossless, lossy), decompression algorithms, color conversion algorithms (e.g., contone to binary, or binary to grayscale) and the like may be performed to provide a high quality output document 316.

It should be noted that the output print quality of image data from an output device 314 such as a MFD may depend the type of system or device (and its available output modes/resolution). In some cases, multiple print quality modes (PostScript driver), each with a different resolution, are supported.

In an embodiment, the system or apparatus 303 may further comprise one or more elements for determining a billing structure and/or a billing cost for outputting a page or document via an output device such as device 314. For example, as shown in FIG. 10, an examination element 318 and/or cost calculation element 320 may be provided. In an embodiment, the examination element 318 and/or cost calculation element 320 may be a part of the image data the system 303. In an embodiment, the elements 318 and/or 320 are separate from the image path of the system 303. In an embodiment, the features, calculations, and/or determinations provided by examination element 318 and/or cost calculation element 320 may be incorporated into one or more processing elements, such as elements 304, 310, or 312, and therefore such elements should not be limited to the illustrated embodiment.

Examination element 318 may be configured to examine the image data. The examination element 318 may assist in determining the billable pixel count of color pixels in the image data. For example, the examination element 318 may comprise a billable pixel counter element 324 that is configured to perform any of the counting steps such as 114, including 128 and 136, in device dependent space.

The examination element 318 may operatively communicate with a cost calculation element 320. The cost calculation element 320 is configured to calculate a billing cost or an approximate cost for outputting the page and/or document of image data using the determined billable pixel count. The billing cost may be calculated and based on a determined billing structure. For example, if it is determined that a page is to be billed using a Tier-2 of a multi-tiered billing structure, the cost associated with Tier-2 may be employed.

In an embodiment, the billing cost is further calculated based on a type of output device to be used. For example, when printing to a printer or MFD, the chosen type of output device may alter the cost for printing the page or document due to the plurality of output modes, inks, toners, and other elements which contribute to the quality of the output document 316. In an embodiment, the cost calculation element 320 is configured to operatively communicate with the examination device 318 and at least one of the processing elements (such as 310 or 312) to calculate a billing cost for outputting the page and/or document.

In a possible embodiment, examination element 318 and cost calculation element 320 are part of a billing system to be implemented by an operative set of processor executable instructions configured for execution by at least one processor or processing element. The billing system may be provided at a remote location with respect to the at least one processor. In an embodiment, the at least one processor is provided in an image processing apparatus, which may comprise an input device for inputting image data and an output device for outputting image data. In an embodiment, the at least one processor of the billing system is provided at a remote location with respect to an output device. As noted above, at least one processing element of system 303 may implement the operative set of processor executable instructions of the billing system by communicating via the network 322, for example. The at least one processing element may thus be provided in the same or a remote location with respect to the output device. In some cases, the examination element 318 and/or cost calculation element 320 may communicate an approximate cost or billing cost to the processor/system 303. In some cases, the examination element 318 and/or cost calculation element 320 may be a part of the processor which communicates with system 303 or an output device.

In a possible embodiment, the cost calculated by the cost calculation element 320 (or its associated processing element) may be sent directly to the output device 314. For example, as shown in FIG. 10, the cost calculation element may communicate via path 307 the approximate billing cost to the output device 314. In this case, the cost may be output via a display, screen, or even a print job. By providing the cost in such a manner—i.e., before outputting the image data via a printing or copying output device—the customer can decide if the image data should be marked via interface 312 and output device 314, or if the data should be saved/discarded (e.g., such as if the cost is too high). The customer may choose to output the image data (e.g., via contact with network 322 or system 303) through the use of an activation button, for example (e.g., see FIG. 1 at 118).

Also, it is envisioned that an embodiment in accordance with this disclosure may include a system that utilizes a network connection 322 for proposed billing estimates. For example, a customer may submit a proposed job (e.g., document) to a website such that a cost estimate for outputting (e.g., printing) the job may be provided to the customer via such website. In an embodiment, it is envisioned that the estimate of how much the job will cost may be determined by considering a predetermined type of printing apparatus for output. Depending on the type of device, apparatus, or machine used for output, the cost estimate of the job may differ. Additionally, in an embodiment, it is envisioned that the system and/or website may estimate theoretical costs of the job if the document is printed with alternative type of printing devices or apparatuses, and that such theoretical costs may be presented to the customer (e.g., via the website). These alternative types may include but are not limited to, different brands or types of machines (e.g., company make and model), different output resolutions/capabilities, or different print shops, for example. A system and/or website may utilize a method such as method 100 to estimate such costs, for example. The system may comprise similar elements noted with respect to the image path of the system 300 in FIG. 10, including, but not limited to, a communication device (such as a network), examination element, cost calculation element, processor and processing elements, for example. The system may include a personal computer (PC) or display device for displaying an estimated cost being communicated via a connected network. The network may include any type of network such as the Internet, Wi-Fi, DSL, local area network (LAN), or wide area network (WAN), for example. Such a system is advantageous to a customer as it allows the customer to review theoretical costs before any actual printing or marking occurs. The customer is able to decide, based on a cost estimate, if the job should be output (e.g., printed), without actually outputting the job. Furthermore, the customer may make a decision whether or not to output a job based on types of printing machines. For example, if the system/website includes cost estimates for outputting the job using one or more devices or apparatuses, the customer has the option of choosing a device or apparatus should be used to output the document (or not used), based on the customer's pricing point.

FIG. 11 illustrates a flow chart/block diagram illustrating exemplary modules for implementing the method of FIG. 3 associated with processing modules in an image path 1100. As shown, the front end image processing elements and back end image processing elements may be provided. In accordance with an embodiment, a neutral page detection module and pixel count normalization module is provided to process image data using a method as shown in FIG. 3. Also provided are a binary to contone conversion module and pixel counting module. In this example, when non-neutral/color pixels are counted (e.g., in binary CMYK domain), contone data is available (the contone data is converted from binary). However, as shown by the example image paths of FIGS. 12 and 13, other variants are possible.

FIG. 12 illustrates a flow chart/block diagram illustrating exemplary modules for implementing the method of FIG. 6 associated with processing modules in an image path 1200. In accordance with an embodiment, a neutral pixel detection module is provided in the front end image processing elements. Also shown is a pixel counting module provided before the memory/disk for job storage. In this embodiment, the pixel counting module counts the number of color pixels (in binary CMYK domain) but the counting is controlled by contone domain detection. For example, the control may be from the neutral pixel detection (in the L*a*b domain) as described above with respect to FIG. 6, or the neutral/color page detection (in CMYK domain) as described with respect to FIG. 3. Using CMYK contone domain detection to control the counted number of color pixels provides a less expensive implementation. For example, it can be expensive to line up the neutral detection tag with the binary image (in particular, when a binary to contone conversion module is provided in the image path) and L*a*b based neutral pixel detection may not be available for print jobs.

FIG. 13 illustrates a flow chart/block diagram illustrating exemplary modules for implementing the methods of FIGS. 3 and 6 associated with processing modules in an image path 1300. Both neutral pixel detection module and neutral page detection module are shown in this image path 1300, as well as two pixel counting modules (one before storage, one after/before output). Using both neutral page based detection with neutral pixel detection (in L*a*b domain) to control binary CMYK pixel counting may also improve the determination of the billable color pixel count. For example, in an embodiment, for a copy job counting (for binary CMYK) may be performed before or after binary to contone conversion (when that module is invoked). While L*a*b domain neutral pixel detection is beneficial for determining composite black generated by the image path (i.e., color pixels rendered neutral or gray), it may be limited in dealing with composite K in the original image data, because of the limited context used in detection. Such limitations may depend on the neutral pixel detection method, for example. Generally, it is expensive to expand the context window for analyzing a pixel of interest and its neighboring pixels, as it's a sliding window making color (non-neutral)/neutral decisions on a pixel-by-pixel basis. The neutral page detection module looks at a resolution reduced version of the original image (subset). It can be viewed as using a tiling window, which is generally a larger window). Thus, it is generally not more costly to make decisions based on bigger context. In other words, the neutral page detection may be more effective in handling composite black original image data.

For any of the above described image paths, it should be noted that color pixels may be counted in device dependent space in the binary domain or in the contone domain. Image data may be stored in contone or binary.

In addition to the herein described diagrams, other variants are possible. For example, not all of modules shown in FIGS. 11-13 need to be provided, and other modules may be included that are not illustrated. For example, a binary to contone conversion module need not be provided to look at device independent image data and/or device dependent image data. Image data may be stored in contone and rendered in a mark path after being retrieved from memory or storage (and thus a binary to contone module is not needed). In a similar manner, if image data is stored as rendered binary image data, when it is time for marking, the stored and rendered binary image data may be sent directly to the marking engine for output (again, a conversion module is not required).

With the herein disclosed methods, existing image paths may be easily altered. For example, neutral pixel and neutral page detection modules may already exist in the image path. As another example, an image path may be missing or have a capability at a different time than indicated. For example, an image path may not have a pixel counting capability prior to job storage as shown the image paths of FIGS. 12 and 13. Therefore, a pixel counting module may be placed after job storage (e.g., after both a copy and print job processing) if so desired.

Other embodiments include incorporating the above methods into a set of computer executable instructions readable by a computer and stored on a data carrier or otherwise a computer readable medium, such that the method 100 (in FIG. 1, 3, or 6) is automated. In a possible embodiment, the methods may be incorporated into an operative set of processor executable instructions configured for execution by at least one processor. FIGS. 1, 3, and 6 show flow charts of such computer readable instructions. For example, in some embodiments, memory or storage of an output device carrying instructions is configured such that when the executable instructions are executed by a computer or processor, they cause a computer or processor to automatically perform a method for determining a billing structure for outputting documents. Such instructions may be contained in memory 306, for example. In alternative embodiments, hard-wired circuitry may be used in place of or in combination with software instructions to implement the disclosure. Thus, embodiments of this disclosure are not limited to any specific combination of hardware circuitry and software. Any type of computer program product or medium may be used for providing instructions, storing data, message packets, or other machine readable information associated with the methods 100. The computer readable medium, for example, may include non-volatile memory, such as a floppy, ROM, flash memory, disk memory, CD-ROM, and other permanent storage devices useful, for example, for transporting information, such as data and computer instructions. In any case, the medium or product should not be limiting.

In addition, it should be noted that the system/apparatus 300 may include a display or control panel user interface (UI) that allows a customer to read the billing meter. Meter reads may be used for cost-per-copy pricing, for example. Such meter reads can be obtained by accessing the local user interface on the control panel, or, alternatively, by accessing a remote user interface using an Internet or web connection. For example, a simple interface may be provided that enables a customer or supplier to manage, configure, and monitor networked printers and MFDs from a desktop or laptop using an embedded web server. The location and accessibility of the billing meters on the display/control panel interface should not be limiting. For example, a user may scroll through a list of the billing plans that are available directly on the machine, as well as the billing costs associated therewith, or on a computer. In some cases, the billing meters can also be viewed on a usage profile report. Such a report may be printed or electronic. In the case of an electronic report, for example, one may access such information via a network and an appropriate IP address associated with the device. This information may be accessed via a browser. In an embodiment, the device or system updates the usage in real time. Thus, the billing meters that are accessible via a remote location will match the billing meters of the user interface and its displayed counters.

While the principles of the disclosure have been made clear in the illustrative embodiments set forth above, it will be apparent to those skilled in the art that various modifications may be made to the structure, arrangement, proportion, elements, materials, and components used in the practice of the disclosure. For example, the system 303 may be a computer system which includes a bus or other communication mechanism for communicating information, and one or more of its processing elements may be coupled with the bus for processing information. Also, the memory 306 may comprise random access memory (RAM) or other dynamic storage devices and may also be coupled to the bus as storage for the executable instructions. Storage device 308 may include read only memory (ROM) or other static storage device coupled to the bus to store executable instructions for the processor or computer. Alternatively, another storage device, such as a magnetic disk or optical disk, may also be coupled to the bus for storing information and instructions. Such devices are not meant to be limiting.

It will be appreciated that various of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A processor-implemented method for determining a billing structure for outputting documents comprising at least one page using an image processing apparatus, the image processing apparatus comprising at least one processor for processing documents containing image data comprising a plurality of pixels, the method comprising the following acts implemented by the at least one processor:
   receiving image data of a document;
   determining if the pixels in the image data in device independent space are neutral or non-neutral;
   estimating a color count of color pixels in device independent space and determining if the image data of the document is substantially neutral or color;
   converting the plurality of pixels of the image data in device independent space into a plurality of pixels in device dependent space;
   determining a pixel count of color pixels in the image data in the device dependent space;
   determining a billable pixel count of color pixels for marking and outputting the image data in device dependent space, and
   determining the billing structure for the image data of the document based on the billable pixel count,
   wherein the determined billable pixel count of color pixels is based on at least both of the estimated color count in device independent space and the determined pixel count in device dependent space.

2. The method according to claim 1, wherein the neutral pixels are determined by applying a neutral page determination algorithm to the image data in device independent space.

3. The method according to claim 1, wherein determination of neutral or non-neutral pixels in device independent space comprises:
   comparing pixels of the image data against a set of color thresholds; and
   determining a number of pixels exceeding the set of color thresholds,
   wherein the number of pixels exceeding the set of color thresholds is used for the estimated color count.

4. The method according to claim 1, wherein determining the billable pixel count further comprises:
   normalizing the estimated color count of the document;
   normalizing the determined pixel count of the document; and
   determining a minimum of the normalized counts,
   wherein the normalizing of each of the estimated color count and the determined pixel counts comprises scaling the counts such that the normalized counts are of a common scale, and
   wherein the determined minimum is used for the billable pixel count of color pixels in the document.

5. The method according to claim 1, wherein the neutral pixels are determined by applying a neutral pixel determination algorithm to the image data in device independent space.

6. The method according to claim 1, further comprising:
   tagging the plurality of pixels with tags based on the neutral and/or non-neutral determination.

7. The method according to claim 6, wherein the tagging comprises indicating if a pixel is neutral or color.

8. The method according to claim 7, wherein the determined billable pixel count does not include the tagged neutral pixels.

9. The method according to claim 6, wherein the determined billable pixel count of color pixels in the image data is based on information associated with the tags.

10. The method according to claim 9, wherein determining the billable pixel count comprises:
for each pixel of image data:
determining a color of each pixel of image data in device dependent space;
comparing the determined color in device dependent space to color information provided by the tag, and
wherein, if the determined color in device dependent space for a selected pixel is color or non-neutral and the tag indicates that the selected pixel is color, then counting the selected pixel for the billable pixel count;
else, the selected pixel is not counted for the billable pixel count.

11. The method according to claim 1, wherein the image processing apparatus further comprises an input device for inputting documents, and wherein the method further comprises:
receiving the image data of the document using the input device, the input device being selected from the group consisting of: an image input terminal, a memory device, or a storage device.

12. The method according to claim 1, wherein the image processing apparatus further comprises an image output terminal for outputting documents, and wherein the method further comprises:
outputting the processed image data of the document in device dependent space using the image output terminal.

13. The method according to claim 1, wherein the determined billing structure is based on a multi-tiered threshold value.

14. The method according to claim 1, wherein the image processing apparatus further comprises a cost calculation element for calculating billing costs, and wherein the method further comprises:
calculating a billing cost using the cost calculation element for outputting the document based on the determined billing structure.

15. The method according to claim 1, wherein the pixels in device independent space are in L*a*b space and wherein the pixels in the device dependent space are of one or more colors selected from the group consisting of: cyan (C), magenta (M), or yellow (Y).

16. A system for determining a billing structure for outputting documents comprising at least one page using an image processing apparatus, the system comprising:
an input device for receiving a document containing image data, the image data comprising a plurality of pixels;
a plurality of processing elements associated with the image processing apparatus for processing the pixels of the image data into a device dependent space, each of the processing elements comprising an input and an output; and
an output device for outputting a document,
wherein one or more of the processing elements is configured to: determine if the pixels in the image data in device independent space are neutral or non-neutral; estimate a color count of color pixels in device independent space and determine if the image data of the document is substantially neutral or color; convert the plurality of pixels in device independent space into a plurality of pixels in device dependent space; determine a pixel count of color pixels in the image data in the device dependent space; determine a billable pixel count of color pixels for marking and outputting the image data in device dependent space using the output device, and determine the billing structure for the image data of the document based on the billable pixel count,
wherein the determined billable pixel count of color pixels is based on at least both of the estimated color count in device independent space and the determined pixel count in device dependent space.

17. The system according to claim 16, wherein the input device is selected from the group consisting of: an image input terminal, a memory device, or a storage device.

18. The system according to claim 16, wherein the output device is selected from the group consisting of: an image output terminal, a display, a printing device, a copying device, or a multi-function device.

19. The system according to claim 18, wherein the output device is associated with the image processing apparatus.

20. The system according to claim 16, further comprising:
a cost calculation element for calculating a billing cost for outputting the page and/or document based on the determined billing structure.

21. The system according to claim 16, wherein the one or more of the processing elements is further configured to determine neutral and non-neutral pixels in device independent space by:
comparing pixels of the image data against a set of color thresholds; and
determining a number of pixels exceeding the set of color thresholds,
wherein the number of pixels exceeding the set of color thresholds is used for the estimated color count.

22. The system according to claim 16, wherein the determined billable pixel count comprises the one or more of the processing elements being configured to:
normalize the estimated color count of the document;
normalize the determined pixel count of the document; and
determine a minimum of the normalized counts,
wherein the normalizing of each of the estimated color count and the determined pixel counts comprises scaling the counts such that the normalized counts are of a common scale, and
wherein the determined minimum is used for the billable pixel count of color pixels in the document.

23. The system according to claim 16, the one or more of the processing elements is further configured to:
tag the plurality of pixels with tags based on the neutral and/or non-neutral determination.

24. The system according to claim 23, wherein the tagging comprises indicating if a pixel is neutral or color.

25. The system according to claim 24, wherein the determined billable pixel count does not include the tagged neutral pixels.

26. The system according to claim 23, wherein the determined billable pixel count of color pixels in the image data is based on information associated with the tags.

27. The system according to claim 26, wherein the determined billable pixel count comprises:
for each pixel of image data, the one or more of the processing elements is configured to:
determine a color of each pixel of image data in device dependent space;
compare the determined color in device dependent space to color information provided by the tag, and
wherein, if the determined color in device dependent space for a selected pixel is color or non-neutral and the tag indicates that the selected pixel is color, then count the selected pixel for the billable pixel count;
else, do not count the selected pixel for the billable pixel count.

28. The system according to claim 16, wherein the pixels in device independent space are in L*a*b space and wherein the pixels in the device dependent space are of one or more colors selected from the group consisting of: cyan (C), magenta (M), or yellow (Y).

29. A non-transitory computer readable medium comprising instructions that, when executed by a computer, directs a computer to perform a method for determining a billing structure for outputting documents using an image processing apparatus, the method comprising:

receiving image data of a document;

determining if the pixels in the image data in device independent space are neutral or non-neutral;

estimating a color count of color pixels in device independent space and determining if the image data of the document is substantially neutral or color;

converting the plurality of pixels of the image data in device independent space into a plurality of pixels in device dependent space;

determining a pixel count of color pixels in the image data in the device dependent space;

determining a billable pixel count of color pixels for marking and outputting the image data in device dependent space, and determining the billing structure for the image data of the document based on the billable pixel count, wherein the determined billable pixel count of color pixels is based on at least both of the estimated color count in device independent space and the determined pixel count in device dependent space.

30. The medium according to claim 29, wherein determination of neutral or non-neutral pixels in device independent space comprises:

comparing pixels of the image data against a set of color thresholds; and determining a number of pixels exceeding the set of color thresholds, wherein the number of pixels exceeding the set of color thresholds is used for the estimated color count.

31. The medium according to claim 29, wherein determining the billable pixel count comprises:

normalizing each of the estimated color count and the determined pixel count such that both of the normalized counts are of a common scale, and determining a minimum of the normalized counts, wherein the determined minimum is used for the billable pixel count of color pixels in the document.

32. The medium according to claim 29, further comprising:

tagging the plurality of pixels with tags based on the neutral and/or non-neutral determination to indicate if each pixel is neutral or color, wherein the determined billable pixel count does not include the tagged neutral pixels.

33. The medium according to claim 29, wherein the determined billable pixel count of color pixels in the image data is based on information associated with the tags, wherein determining the billable pixel count comprises:

for each pixel of image data:

determining a color of each pixel of image data in device dependent space;

comparing the determined color in device dependent space to color information provided by the tag, and wherein, if the determined color in device dependent space for a selected pixel is color or non-neutral and the tag indicates that the selected pixel is color, then counting the selected pixel for the billable pixel count;

else, the selected pixel is not counted for the billable pixel count.

* * * * *